US012348266B2

(12) United States Patent
Sanchez et al.

(10) Patent No.: US 12,348,266 B2
(45) Date of Patent: Jul. 1, 2025

(54) POINTING UNITS AND METHODS OF OPERATING POINTING UNITS

(71) Applicant: Airbus SAS, Blagnac (FR)

(72) Inventors: Crisanto Quintana Sanchez, Bristol (GB); Gavin Erry, Bristol (GB); Yoann Thueux, Bristol (GB)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 17/976,718

(22) Filed: Oct. 28, 2022

(65) Prior Publication Data

US 2023/0135567 A1  May 4, 2023

(30) Foreign Application Priority Data

Oct. 29, 2021 (GB) ........................... 2115614
Feb. 28, 2022 (GB) ........................... 2202764

(51) Int. Cl.
*H04B 10/11* (2013.01)
*B64D 47/02* (2006.01)
*G02F 1/29* (2006.01)

(52) U.S. Cl.
CPC ............. *H04B 10/11* (2013.01); *B64D 47/02* (2013.01); *G02F 1/292* (2013.01); *G02F 2202/30* (2013.01); *G02F 2203/05* (2013.01); *G02F 2203/07* (2013.01); *G02F 2203/50* (2013.01); *G02F 2203/58* (2013.01)

(58) Field of Classification Search
CPC ..... H04B 10/11; G02F 1/292; G02F 2202/30; G02F 2203/05; G02F 2203/07; G02F 2203/50; G02F 2203/58

USPC .......................................................... 398/118
See application file for complete search history.

(56) References Cited

U.S. PATENT DOCUMENTS

| | | | |
|---|---|---|---|
| 4,717,823 A | 1/1988 | Steimel et al. | |
| 5,471,326 A | 11/1995 | Hall et al. | |
| 6,347,001 B1 * | 2/2002 | Arnold | H04B 10/118 398/124 |
| 6,958,868 B1 | 10/2005 | Pender | |
| 8,009,280 B1 * | 8/2011 | Erry | G01J 9/00 356/497 |
| 9,231,698 B2 * | 1/2016 | Erkmen | H04B 7/18504 |

(Continued)

FOREIGN PATENT DOCUMENTS

| | | | |
|---|---|---|---|
| CN | 101630970 A | 1/2010 | |
| EP | 1953932 A1 * | 8/2008 | G02B 7/007 |
| WO | 2020/056307 | 3/2020 | |

OTHER PUBLICATIONS

Kaymak et al; A Survey on Acquisition, Tracking, and Pointing Mechanisms for Mobile Free-Space Optical Communications ; 2018; IEEE communications and Surveys; pp. 1-20. (Year: 2018).*

(Continued)

*Primary Examiner* — Amritbir K Sandhu
(74) *Attorney, Agent, or Firm* — Nixon & Vanderhye P.C.

(57) ABSTRACT

A pointing unit (100) for use with a free space optical (FSO) communications terminal (105) including an optical arrangement (101) of one or more optically transmissive steering elements (101a, 101b). The steering elements (101a, 101b) are arranged in an optical path of an incident beam (107) entering the optical arrangement (100), and the orientation of at least one element (101a, 101b), and the refractive index of at least one element (101a, 101b), are controllable to steer a beam (107b) towards a target (110).

8 Claims, 15 Drawing Sheets

(56) References Cited

U.S. PATENT DOCUMENTS

| | | | |
|---|---|---|---|
| 10,530,478 B2 | 1/2020 | Kingsbury et al. | |
| 10,917,173 B2* | 2/2021 | Kingsbury | H04B 7/18513 |
| 10,989,982 B2 | 4/2021 | Ataei et al. | |
| 11,476,933 B1 | 10/2022 | Mitchell | |
| 2003/0179804 A1 | 9/2003 | Cook et al. | |
| 2006/0198004 A1 | 9/2006 | Ozawa | |
| 2007/0153358 A1 | 7/2007 | Duston et al. | |
| 2013/0140429 A1 | 6/2013 | Schneider | |
| 2014/0313568 A1* | 10/2014 | Smith | G01S 7/499 |
| | | | 359/298 |
| 2015/0069216 A1 | 3/2015 | Hutchin | |
| 2016/0043800 A1 | 2/2016 | Kingsbury et al. | |
| 2017/0025754 A1* | 1/2017 | Driscoll | H01Q 15/02 |
| 2017/0025756 A1 | 1/2017 | Driscoll et al. | |
| 2017/0040711 A1* | 2/2017 | Rakib | H01Q 25/002 |
| 2019/0025509 A1* | 1/2019 | Kim | G01S 17/36 |
| 2019/0346658 A1 | 11/2019 | She et al. | |
| 2020/0025888 A1 | 1/2020 | Jang et al. | |
| 2020/0144719 A1 | 5/2020 | Scarborough et al. | |
| 2020/0183148 A1* | 6/2020 | Park | G02B 26/06 |
| 2020/0183418 A1* | 6/2020 | Wang | B60W 40/04 |
| 2020/0389232 A1 | 12/2020 | Danesh et al. | |
| 2021/0067246 A1 | 3/2021 | Nykolak et al. | |
| 2021/0242939 A1* | 8/2021 | Ducellier | G02B 26/0891 |
| 2021/0263293 A1 | 8/2021 | Ducellier et al. | |

OTHER PUBLICATIONS

Singh et al; Designing Efficient Phase-Gradient Metasurfaces for Near-Field Meta-Steering Systems; Aug. 2021; IEEE Access; pp. 1-14. (Year: 2021).*

A Bosco et al., "Proposal for a Fast Scanning System Based on Electro-optics for use at the ILC Laser-Wire" Proceedings of EPAC 2006, Edinburgh Scotland, pp. 1118-1120.

Yagiz Kaymak, et al., "A Survey on Acquisition, Tracking and Pointing Mechanisms for Mobile Free-Space Optical Communications", IEEE Communications Surveys & Tutorials, vol. 20, No. 2, Apr.-May 2018, pp. 1104-1123 (20 pages).

Jihwan Kim, et al., "Wide-Angle, Nonmechanical Beam Steering Using Thin Liquid Crystal Polarization Gratings", Proc. of SPIE, vol. 7093 709302, Aug. 2008, 12 pages.

Rowan Morris et al., "Liquid Crystal Devices for Beam Steering Applications", MicroMachines, vol. 12., published Feb. 28, 2021, 27 pages.

Vladimir Nikulin, "A Hybrid System for Beam Steering and Wavefront Control", Proceedings of SPIE, Lasers and Applications in Science and Engineering, Jan. 25-29, 2004, 10 pages.

Dalin Song, et al., "Risley Prisms Scanning Optical Imaging System Using Liquid Crystal Spatial Light Modulator", Current Optics and Photonics, vol. 3, No. 3, Jun. 2019, pp. 215-219 (5 pages).

Junbo Wang, et al., "URSI International Symposium on Electromagnetic Theory a More Precise Beam Steering Model for Phase-Delay Metasurface Based Risley Antenna", URSI EM Theory Symposium, EMTS 2019, May 27-31, 2019, 4 pages.

Office Action for U.S. Appl. No. 17/975,162 (Apr. 23, 2025).

* cited by examiner

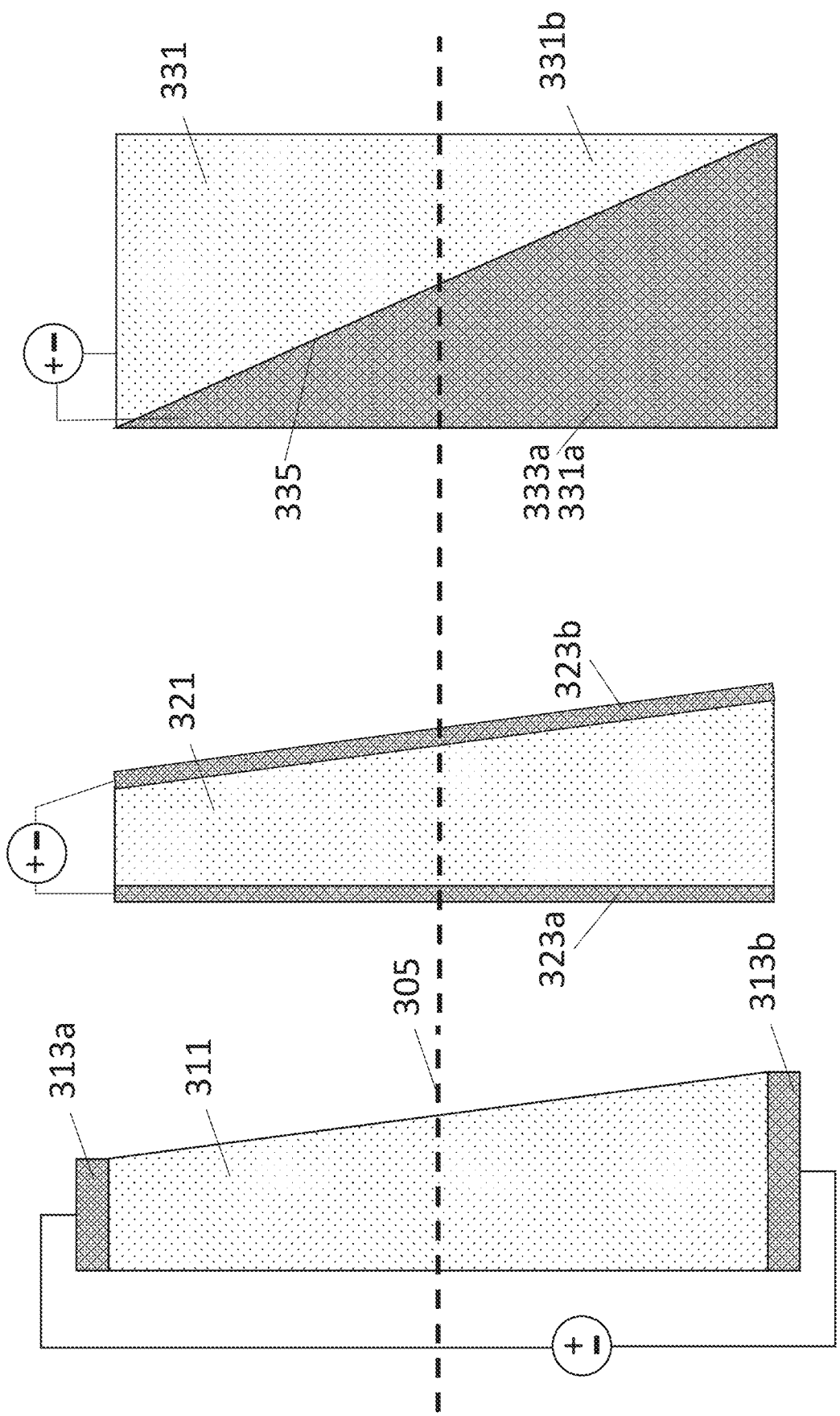

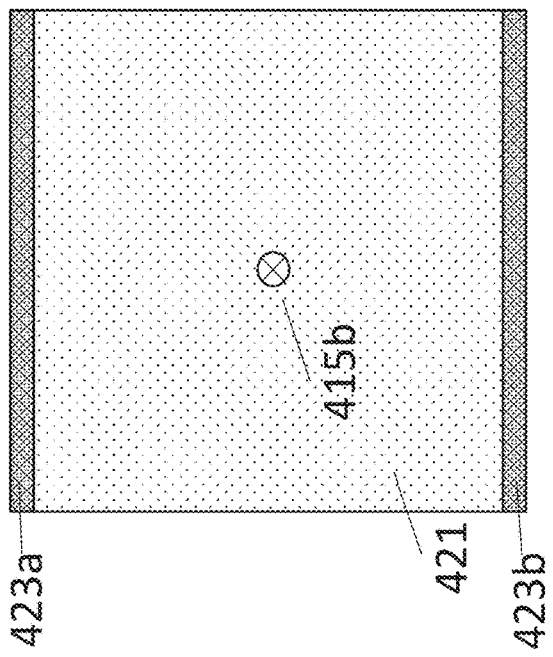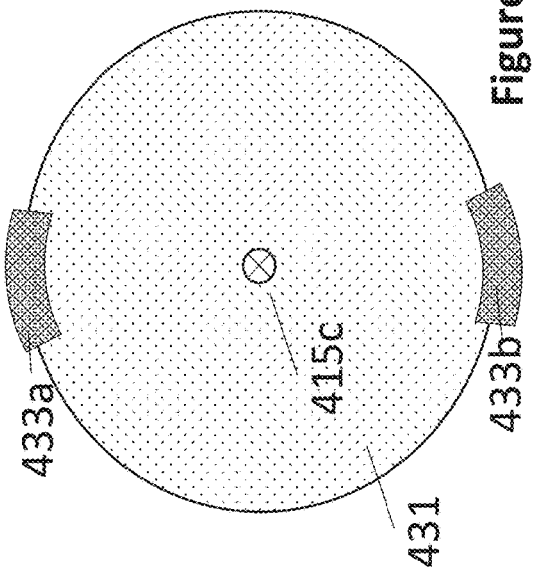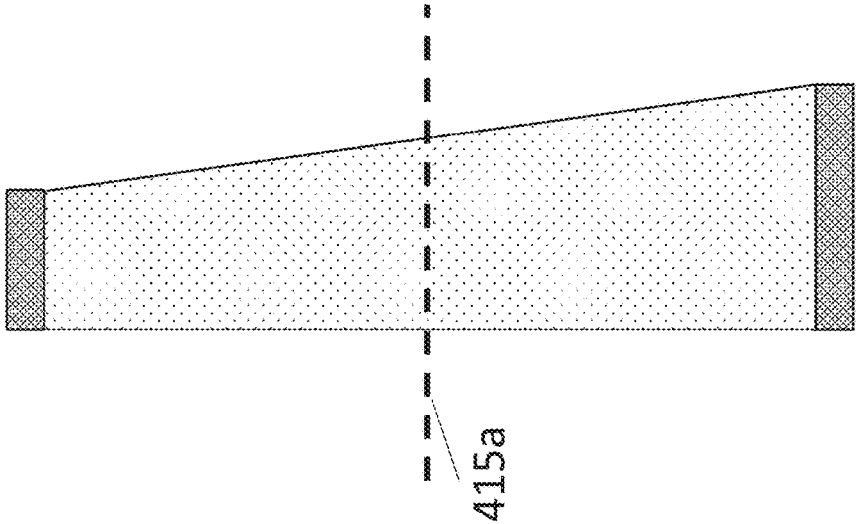

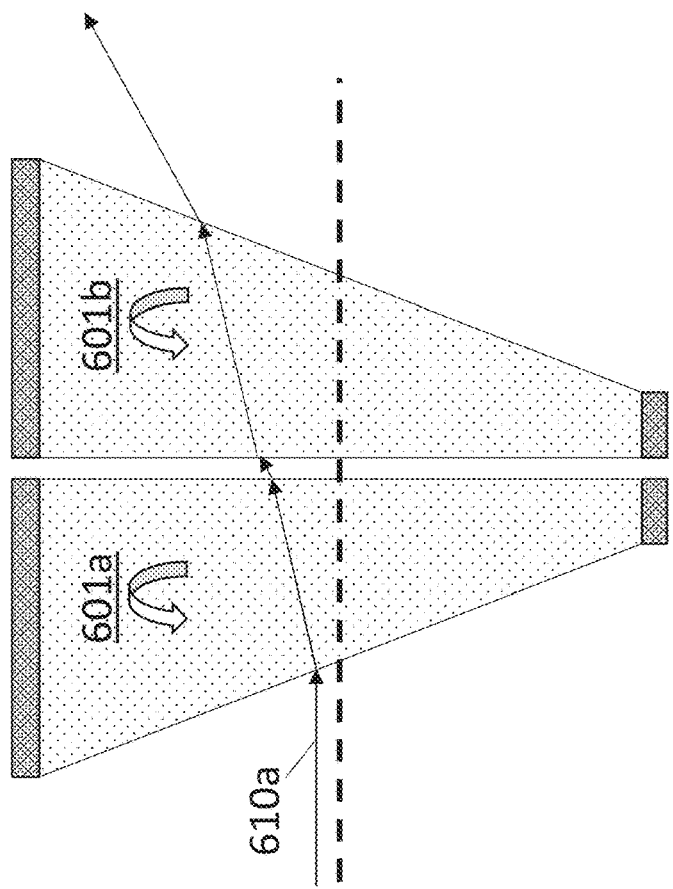
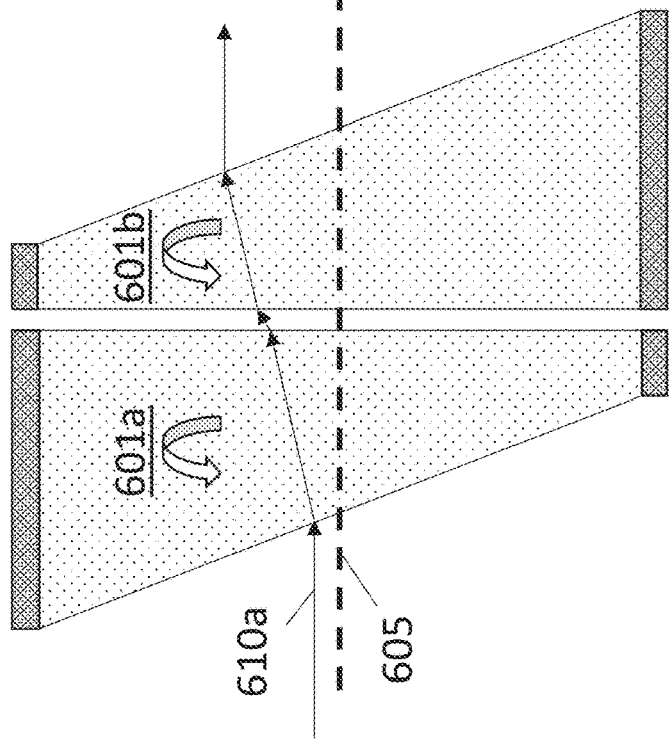

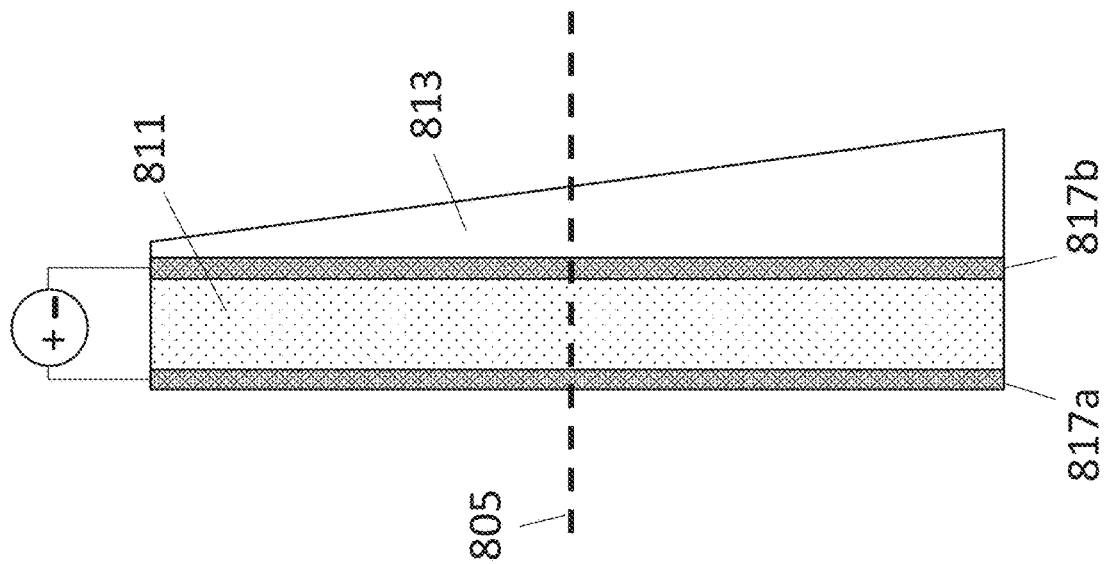
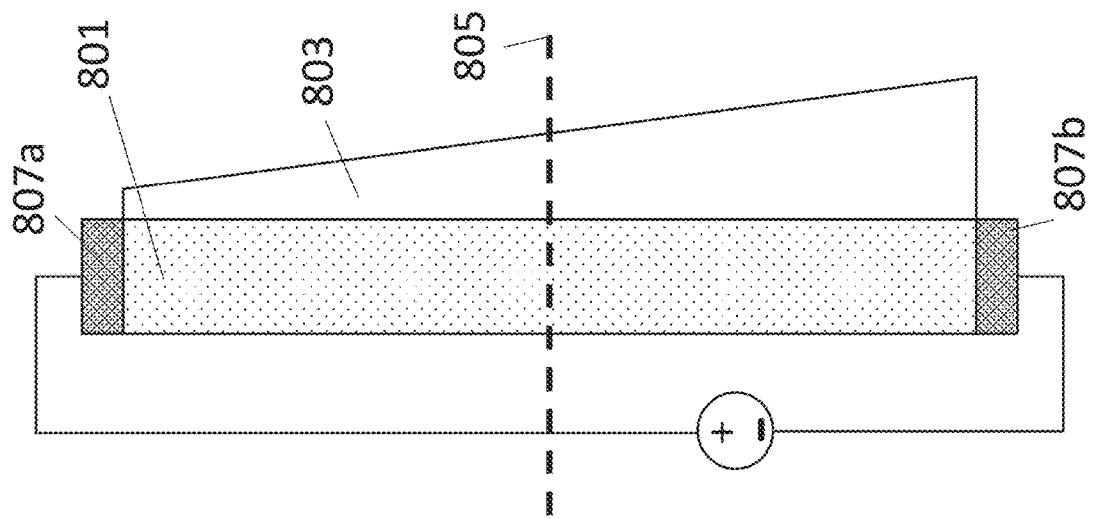

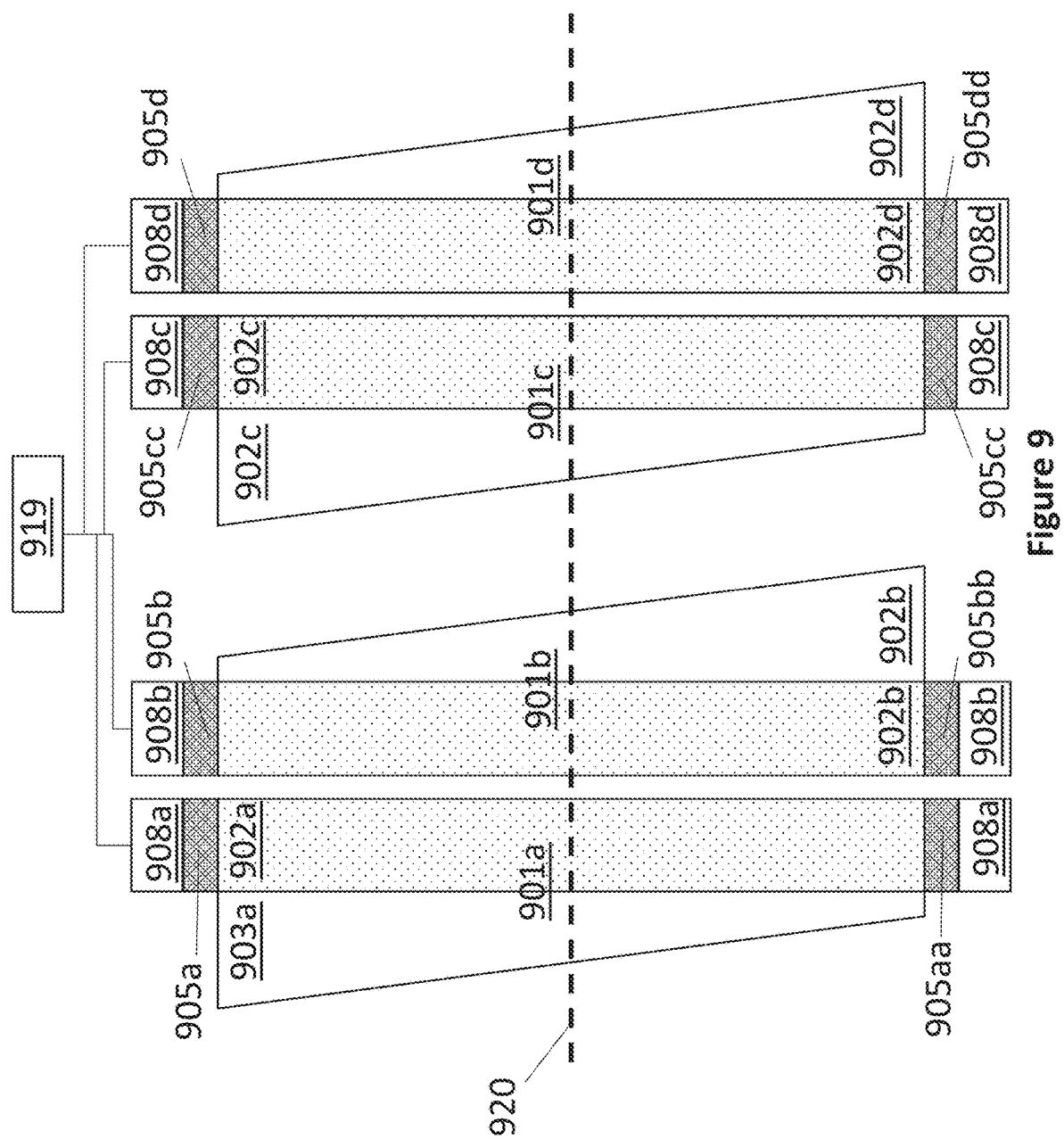

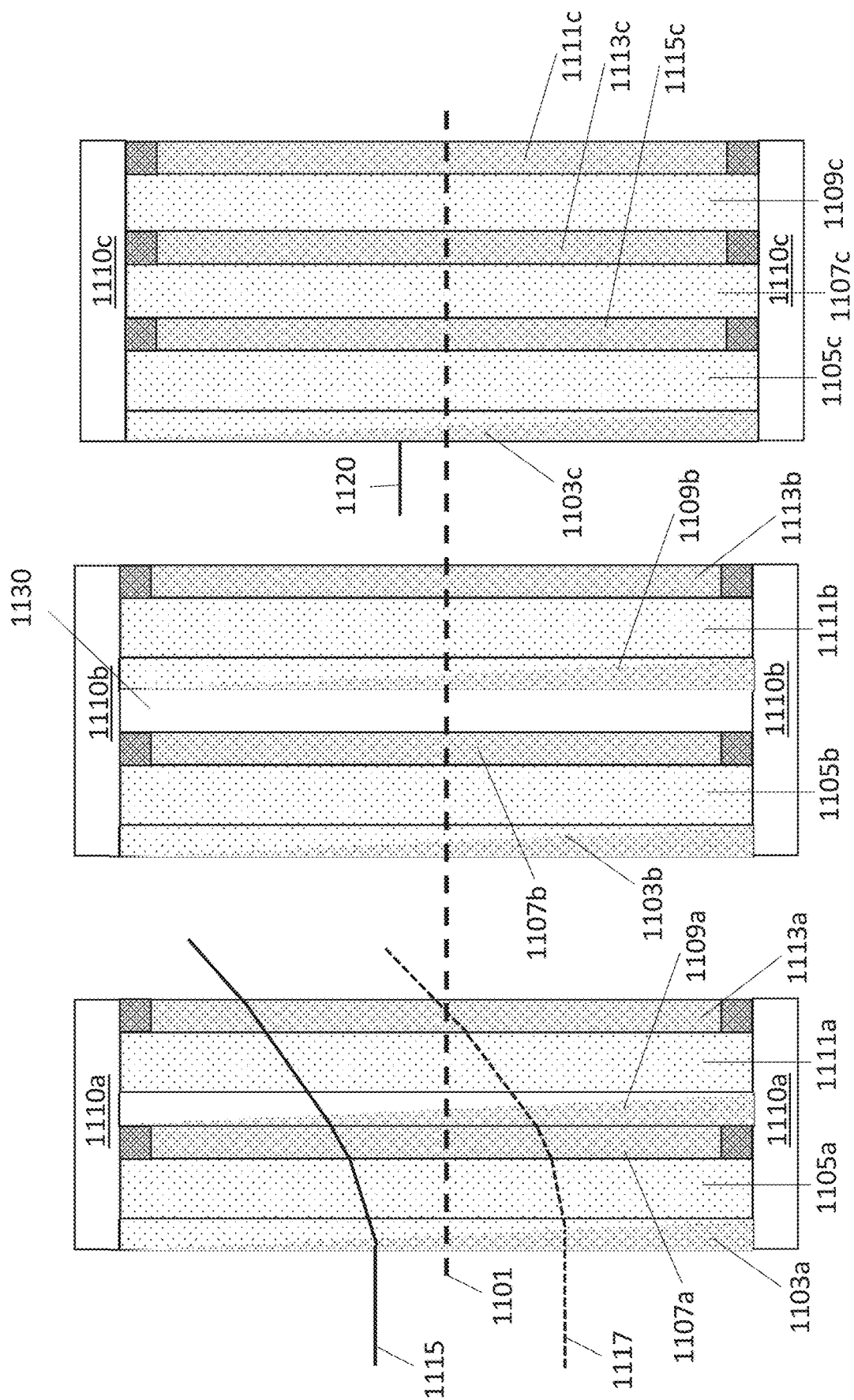

POINTING UNITS AND METHODS OF OPERATING POINTING UNITS

RELATED APPLICATIONS

This application incorporates by reference and claims priority to United Kingdom patent applications GB 2115614.6 filed Oct. 29, 2021, and GB 2202764.3 filed Feb. 28, 2022.

TECHNICAL FIELD

The present invention relates to pointing units and methods of operating pointing units, and more specifically to pointing units and methods of operating pointing units for use with free space optical communications terminals.

BACKGROUND

Free space optical (FSO) communications uses light propagating in free space to transmit data. In the context of FSO communications, 'free space' refers to, for example, air, space, vacuum, or similar and is in contrast with communications via solids such as a fiber-optic cable. FSO communications can be useful for example in cases where communication via physical connections, such as fiber optic cables or other data cables, is impractical. One such case is, for example, communications between an aircraft such as a drone and a ground-based terminal.

FSO communications ordinarily rely on direct line of sight between transmitter and receiver and so rely on directing an optical beam between FSO communication nodes. This demands pointing units which can steer a beam, received from another node, into a receiver module, and steer a transmitted beam towards a target node.

FSO communications can offer higher data rates and improved security as compared to other wireless communication techniques. For example, FSO communications can achieve higher data rates, and can be less susceptible to jamming and interception compared to radio frequency (RF) communications.

SUMMARY

According to a first aspect of the present invention, there is provided A steering element for use in an optical pointing unit, the steering element comprising, along a principal axis thereof: a first optically transmissive metamaterial element, the metamaterial element configured to steer an incident beam by a first steering angle; and a second optically transmissive metamaterial element, the second metamaterial element comprising a metadevice, the metadevice comprising a control input and configured to steer an incident beam by a second steering angle, the second steering angle being variable according to an input signal received at the control input, wherein, the steering element provides an overall beam steering angle which is a function of the first steering angle and the second steering angle.

In examples, the first metamaterial element comprises a planar element which is substantially perpendicular to the principal axis.

In examples, the first and second metamaterial elements comprise planar elements and the planes of the first and second metamaterial elements are substantially parallel to each other.

In examples, the first steering angle is larger than the second steering angle.

In examples, the steering element is monolithic, the steering element is monolithic, the first metamaterial element forming a first layer of the steering element and the second metamaterial element forming a second layer of the steering element.

In examples, in such a steering element being monolithic, the first and second metamaterial elements are formed on a common substrate.

In examples, the steering angle resulting from the first or second metamaterial element is wavelength dependent.

In examples, the steering angle resulting from the first or second metamaterial element is polarisation dependent.

In examples, the first and second metamaterial elements are arranged such that the steering element produces the same overall beam steering angle for a first beam of a first wavelength and a first polarisation and for a second beam of a second wavelength and a second polarisation, the first wavelength different to the second wavelength and the first polarisation orthogonal to the second polarisation.

In examples, the first or second metamaterial element is formed from an all-dielectric structure.

In examples, the first metamaterial element is a metasurface.

In examples, the input signal is an electrical, acoustic, thermal, mechanical or optical signal.

According to a second aspect of the invention, there is provided a pointing unit for use with a free space optical communications terminal, the pointing unit comprising: an optical arrangement comprising one or more optically transmissive steering elements arranged in an optical path of an incident beam entering the optical arrangement, wherein, the optical arrangement is configured so that an orientation of at least one element and a refractive index of at least one element are controllable to steer a beam towards a target.

In examples, the optical arrangement comprises the steering element according to examples of the first aspect of the invention.

In examples, the optical arrangement comprises a first pair of steering elements, each steering element of the first pair comprising a steering element according to examples of the first aspect of the invention.

In examples, such an optical arrangement comprising a first pair of steering elements, the first pair of steering elements comprises matching steering elements.

In examples, such an optical arrangement comprising a first pair of steering elements, the pointing unit further comprises a second pair of steering elements, each of the steering elements according to examples of the first aspect of the invention.

In examples, such an optical arrangement having two pairs of steering elements, the second pair of steering elements comprises matching steering elements.

In examples, at least one steering element is movably mounted in a respective support member In examples, the pointing unit comprises a controller arranged to vary the orientation of each steering element relative to its respective support member to perform coarse steering of the incident beam and to vary the steering provided by the metadevice of each steering element to perform fine steering of the incident beam.

In examples, the support member is a rotation mount and the orientation of the or each steering element is controllable by rotation in a plane that is substantially perpendicular to the principal axis of the respective steering element.

In examples, the first pair of steering elements are arranged as and controlled by the controller as a Risley pair.

In examples, the second pair of steering elements are arranged as and controlled by the controller as a Risley pair.

In examples, the first pair of steering elements match to the second pair of optical elements.

In examples, the principal axes of each steering element are aligned with one another such that they lie along a common axis In examples, the controller is responsive to a guidance unit coupled to the controller.

In examples, the optical arrangement comprises a beam expander at an optical terminal, arranged to expand the beam diameter in the transmit direction and reduce the beam diameter in the receive direction.

In examples, such an optical arrangement comprises a beam expander, the beam expander comprises a telescope arrangement. In other examples, the beam expander could comprise a prismatic arrangement.

In a third aspect, there is provided a vehicle equipped with the pointing unit according to the second aspect.

In examples, the vehicle is an aircraft.

In a fourth aspect, there is provided a method of steering a beam towards a target, comprising: determining a steering direction of a beam; and controlling an optical arrangement to steer the beam, comprising controlling an orientation of at least one element of the optical arrangement and a refractive index of at least one element of the optical arrangement to steer a beam towards a target.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 3a, 3b and 3c are schematic diagrams of examples of steering elements and various arrangements of electrical contacts for steering elements.

FIGS. 4a, 4b and 4c are schematic diagrams of examples of various cross-sections of a steering element, and various arrangements of electrical contacts for a steering element.

FIGS. 6a and 6b are schematic diagrams of exemplary optical arrangements of steering elements arranged in a Risley topology.

FIGS. 8a and 8b are schematic diagrams of exemplary steering elements comprising two portions, and various positions of electrical contacts applied thereto.

FIG. 9 is a schematic diagram of an exemplary Risley topology comprising four steering elements.

FIGS. 11a, 11b and 11c are schematic diagrams of various exemplary steering elements comprising various arrangements of metasurface portions and metadevice portions.

DETAILED DESCRIPTION

Figure 1:
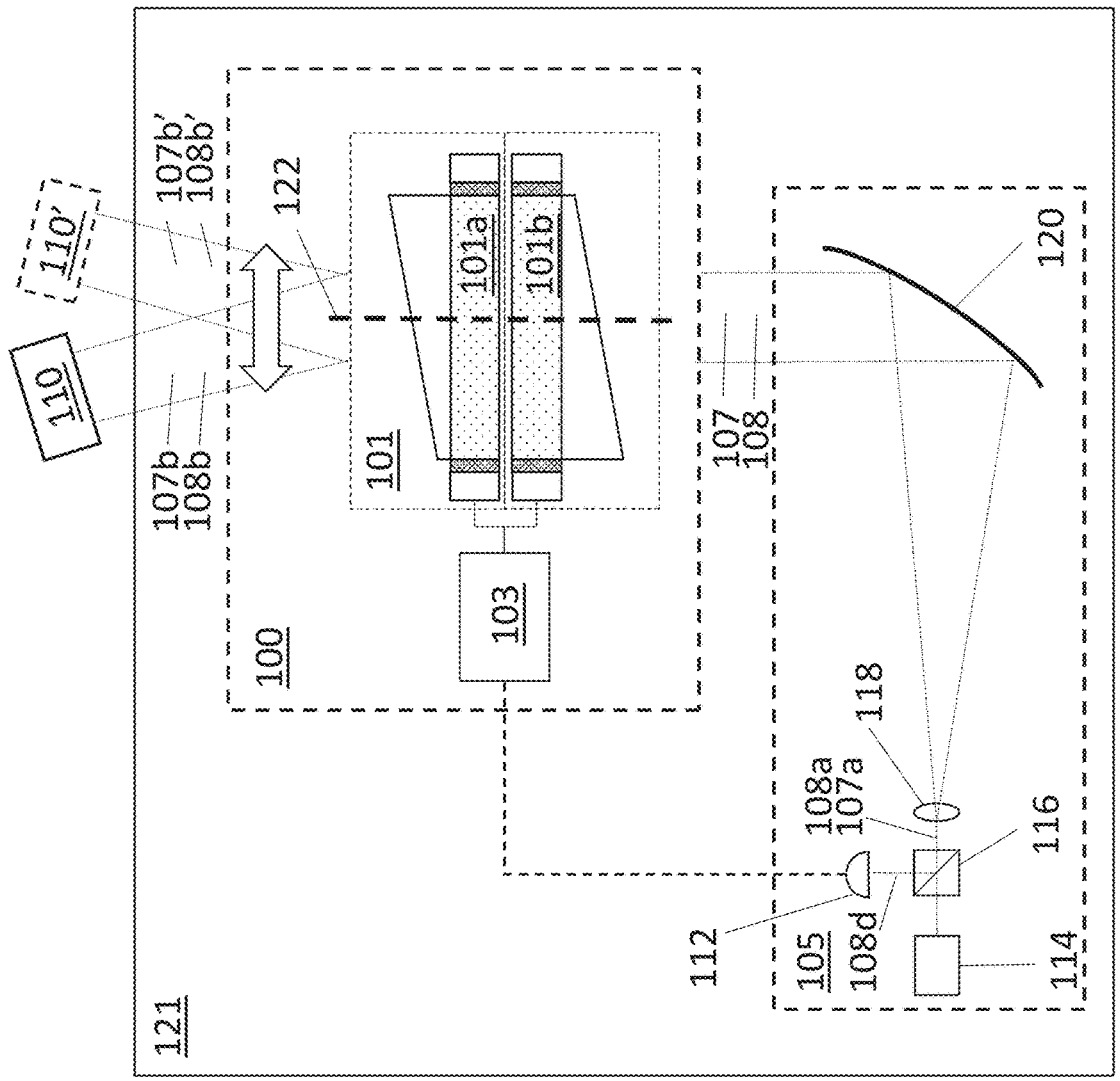
FIG. 1 is a schematic diagram of an exemplary free space optical communications node comprising a pointing unit and terminal.

FIG. 1 shows an exemplary free space optical (FSO) communications node 121 comprising a pointing unit 100 and a terminal 105.

The terminal 105 is arranged to produce an optical output beam 107, 107a, 107b, and receive a return beam 108, 108a, 108b, for use in an optical communications scheme. The terminal 105 comprises an input/output unit 114, the output portion of the input/output unit 114 comprising a laser which emits an output beam 107a. There is a beam expanding portion, comprising a lens 118 and concave mirror 120. The output beam 107a enters the lens 118 and is expanded to become a beam 107 which has a desired diameter for transmission. The concave mirror 120 collimates the beam 107 and directs it to the pointing unit 100.

The terminal 105 may be arranged in various other configurations. For example, variants that do not require beam diameter adjustment may dispense with the beam expanding portion. Additionally, or alternatively, the concave mirror 120 may be dispensed with and/or replaced by a transmissive collimating element, such as a lens, in variants in which the terminal 105 and the pointing unit 100 are arranged broadly in-line with one another. Whether reflective or transmissive optics are deployed in the terminal 105 depends on shape and space requirements of the overall FSO communications node 121, for example as determined by where the node is to be mounted, as will be appreciated by those skilled in the art.

The pointing unit 100 comprises an optical arrangement 101 comprising, in this example, a pair of steering elements 101a, 101b, aligned along an optical axis 122 and operated by a controller 103, which controls actuators (not shown) for varying orientations of the steering elements and electrical circuitry (not shown) for varying electrical fields applied to the steering elements, in a manner to be described. The beam 107 is steered by the pointing unit and transmitted as a steered beam 107b towards a target 110. If the target moves to a new position 110', the controller 103 arranges the steering elements 101a, 101b to steer the beam 107 to the target at its new position as a steered beam 107b'.

When receiving the return beam, the pointing unit 100 receives a beam 108b from the target 110, whereupon the pointing unit 100 steers the beam 108b and transmits it to the terminal 105 as a steered beam 108. The beam expanding portion acts as a beam reducer when receiving the steered beam 108, reducing it to a beam 108a of suitable diameter to be received at the input portion of the input/output unit 114. A beam splitter 116 reflects a portion 108d of the beam 108a to a quadrant tracking guidance unit 112. If the target moves to a new position 110', the pointing unit receives a beam 108b' and the quadrant tracking guidance unit 112 detects a change in the position of beam 108d. As a result of this change, the quadrant tracking guidance unit 112 communicates to the controller 103 the necessary adjustments needed of the steering elements 101a, 101b, such that the input portion of the input/output unit continues to receive the beam 108a.

The controller 103 in examples herein may be an embedded hardware controller operating on the basis of programmed instructions for performing guidance. Such a controller is sufficiently responsive to changes of position of the FSO communications node 121 and/or the target 110 to actuate the optical arrangement 101, and ensure efficient communications, for example, so as to limit the amount of re-transmissions that are required in the event of temporary misalignment between the FSO communications node 121 and the target 110. The controller 103 may instead deploy other arrangements of hardware and/or software (e.g. operating on a programmed processor) that can provide sufficient responsiveness to perform the required guidance and facilitate efficient communications.

In practice, when the FSO communications node 121 is in two-way communications with the target 110, the output beam 107 and the return beam 108 traverse substantially the same optical path, and hence the various steering and guiding arrangements in the FSO communications node 121 serve to guide both output and return beams concurrently.

When producing the output beam 107a, the output portion of the input/output unit 114 is configured to encode data onto the output beam 107a. For example, the output portion of the input/output unit 114 may be configured to modulate the output beam 107a to encode bits of data therein. The data encoded onto the output beam 107a may comprise information to be communicated to the target 110.

The steering elements 101a, 101b are, in this example, wedge prisms. In the present example, the optical arrangement 101 of the two steering elements 101a, 101b, with the optical axis 122 substantially parallel to the direction of the input beam 107, constitutes a Risley topology. A Risley topology is a common optical arrangement for beam steering and can be realised with two or more steering elements. More generally, in other examples, the optical arrangement 101 comprises at least one steering element, and may comprise two or more steering elements, as will be described. The steering elements may, in other examples, be other optical elements capable of steering a beam, such as transmission gratings or metasurface lenses and may be configured in arrangements other than a Risley topology. Examples employing metasurfaces will be described later herein.

To steer the beam 107, the controller 103 varies the orientations of the steering elements 101a, 101b by rotating them in a plane perpendicular to the optical axis 122. This acts to change the angle of incidence of the beam 107 with surfaces of the steering elements 101a, 101b, and thereby change the angle by which the beam 107b is steered. The steering elements 101a, 101b can be rotated independently from one another. Rotation of the steering elements 101a, 101b by the controller 103 allows for coarse steering of the beam 107, whereby the beam can be steered through a relatively wide range, for example being steerable through a cone with an opening angle of 90 degrees. The total range the pointing unit 100 can steer over is known as its field-of-regard (FoR), and will vary according to the optical arrangement that is employed. While in this example the steering elements 101, 101b are rotated in a plane substantially perpendicular to the optical axis 122, these orientational adjustments may, in other examples, be translations, rotations and/or combinations thereof.

The controller 103 is also arranged to vary electric fields applied across the steering elements 101a, 101b. In general, a material placed under an electric field will exhibit an electro-optical Kerr effect response, thereby altering the material's refractive index. Some materials will additionally exhibit a Pockels effect response, which also alters the material's refractive index. In this example, the steering elements 101a, 101b comprise a layer of electro-optic crystal which exhibits a particularly strong Pockels effect refractive index change, in response to an electric field. In such an electro-optic crystal or similar, the Pockels effect refractive index change is large compared to any relatively smaller change of refractive index due to the Kerr effect. By placing electric fields across the steering elements 101a, 101b, the controller can vary the refractive index of each steering element. This allows for fine steering of the beam 107b, wherein it can be varied, for example, by +/−2 degrees according to the present example. Other degrees of fine steering angle can be attained, of course, by using different electro-optic materials and different levels of electric field according to examples herein. In any event, the combination of coarse steering due to reorientation of the steering elements and fine steering due to variations in refractive index contribute to a resultant, overall or composite FoR for examples herein.

Providing for both fine and coarse steering control within one optical arrangement 101 allows for the spatial footprint of the pointing unit 100 to be reduced in comparison with conventional pointing units, for example, in which fine and coarse steering are arranged separately, often with a beam expanding portion between them. Such conventional pointing units can require additional relay optics if using reflective steering elements, which further adds to the weight and cost of the pointing unit.

FIG. 1 presents one possible pointing unit 100 comprising an optical arrangement 101 of steering elements 101a, 101b operated by a controller 103 to realise both fine and coarse steering control. The following figures illustrate other steering element(s) and arrangements suitable for use in examples of the present invention.

Figure 2:
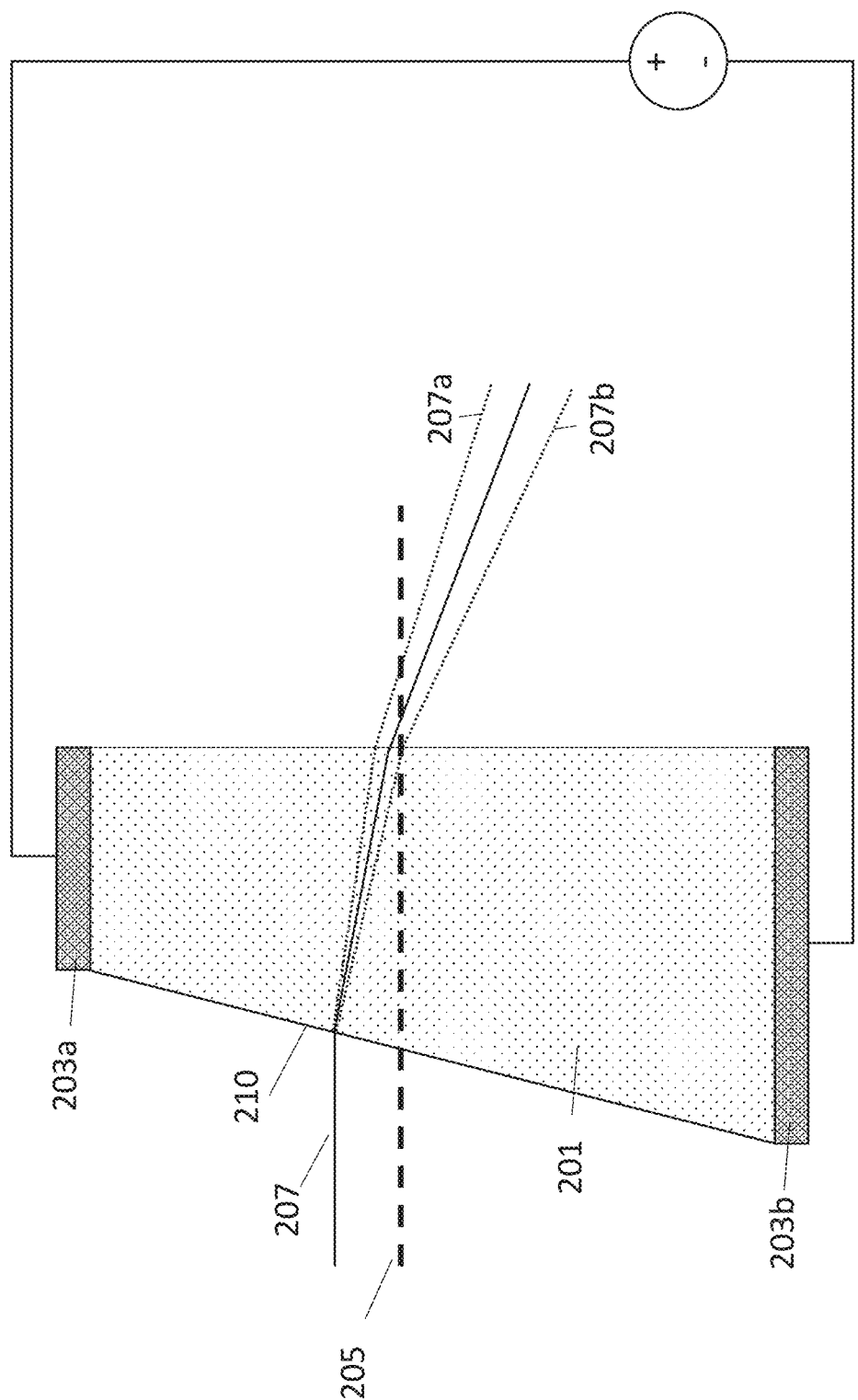
FIG. 2 is a schematic diagram of an exemplary steering element for use in a pointing unit.

FIG. 2 illustrates an example of a steering element, displayed in side view, comprising an element of electro-optic material 201 placed between electrical contacts 203a, 203b, such that an electric field can be applied across the electro-optic element 201. Such a steering element may be deployed alone or in combination with other elements in an optical arrangement according to examples herein. In this example, the electro-optic element 201 is a wedge prism. In use, a beam 207 is incident on a surface 210 of the prism, parallel to an optical axis 205 of the prism, in this example from the left-hand side towards the left hand surface 210, where it undergoes refraction and hence steering, as indicated by the illustrative beam path in the Figure. According to examples, the steering element is further housed in a support structure (not illustrated) which allows for its reorientation, for example, rotation in a plane perpendicular to the optical axis 205, for example, about the optical axis.

The angle of refraction is determined by the refractive index of the electro-optic prism 201. The prism 201, in this example, is of substantially uniform refractive index. In other examples, the refractive index may have an arbitrary refractive index profile in which the refractive index varies along some or multiple dimensions. In such cases, the beam may be steered by the prism at an angle which would correspond with the beam being refracted by a prism of some effective bulk refractive index, even though the element in that case has a non-uniform refractive index.

The angle of steering is dependent upon the orientation of the prism 201 with the incident beam 207. By reorienting the prism, for example by rotation in a plane perpendicular to the plane of the Figure, the beam 207 is incident with the prism at a different angle and can therefore be steered at a different angle. As has been described, reorientation of the steering element forms the basis for the coarse steering capabilities of the pointing unit.

In this example, the electro-optic material forming the prism 201 is an electro-optic crystal. Electro-optic crystals are capable of steering angles of around 1-2 degrees at voltages of around 1-2 kV. Other materials may be suitable, such as liquid crystals, and the prism may include other structures and/or materials required to house the electro-optic material for structural, protective, safety or functional reasons. Such variations afford different degrees of fine steering capability.

For electro-optic materials, an electric field is applied across the prism 201 by the electrical contacts 203a, 203b. In this example, the electrical contacts 203a, 203b span the entirety of top and bottom surfaces of the prism 201, as illustrated in the Figure. Thus, the electric field generated is perpendicular to the optical axis 205 of the prism 201. Other alternatives, where the electrical contacts only span partial portions of the prism and thereby only apply an electric field to a partial region of the prism, are envisioned and discussed hereafter. The electrical contacts 203a, 203b are further arranged to move with the electro-optic element.

The applied electric field modifies the refractive index of the prism 201, the strength of modification for a given material being dependent on the strength of the electric field applied across the material. This further shifts the beam 207. By modifying the strength of the electric field applied across the prism 201, the beam can be moved between two angles, an angle achieved at maximum field strength and an angle achieved when no field is applied, these two angles being indicated in the Figure by beams 270a, 207b. This range of angles is typically small relative to the angles achieved through reorientation of the prism 201, due to the shape of the prism 201, and provides the fine steering capabilities of the steering element and hence the pointing unit 100.

FIGS. 3a-3c illustrate, from side views, examples of three steering elements comprising electro-optic elements with various arrangements of electrical contacts and cross-sectional profiles of the electro-optic elements. An optical axis 305 is also shown through each steering element. Each steering element may be deployed alone or in combination with other elements in an optical arrangement 100 according to examples herein.

In FIG. 3a, electrical contacts 313a, 313b are arranged as in FIG. 2, on top and bottom surfaces of the electro-optic element 311, with them spanning a direction substantially parallel to the optical axis 305, such that an electric field is applied perpendicular to the optical axis 305. Here the electro-optic element 311 is a wedge prism.

In FIG. 3b, contacts 323a, 323b are placed on leading and following surfaces of the electro-optic element 321, the electro-optic element 321 being a wedge prism in this example. The contacts 323a, 323b are placed in planes substantially perpendicular to the optical axis 305, such that an applied electric field is substantially parallel to the optical axis 305. In such a case the contacts 323a, 323b are formed from an optically transparent conductor such as indium tin oxide (ITO), thereby allowing an incident beam to traverse the element with negligible attenuation (reflection, scattering or absorption) due to the contacts 323a, 323b.

In FIG. 3c, the electro-optic element 331 is rectangular in cross-section with the contacts 333a applied to the near and far sides (far contact not illustrated), as depicted in side view. Here the contacts 333a are triangular in profile and do not span the entire surface of the rectangular electro-optic element 331, such that an electric field is only applied to a (triangular) portion 331a of the electro-optic element 331 (into the page). This modifies the refractive index in the portion 331a of the electro-optic element 331 where the electric field is applied, but not (or at least far less so) in the remaining portion 331b. The boundary 335 between these portions 331a, 331b exhibits a refractive index contrast which gives rise to a refraction of a beam incident upon it.

It will be clear to those skilled in the art that the electrical contacts can have any profile which might be desirable for beam steering purposes, without demanding the electro-optic material adopt the same profile. This may be advantageous where manufacturing contacts of arbitrary geometrical complexity is cheaper and/or easier to manufacture and/or structurally more robust than manufacturing an equivalent electro-optic element.

Additionally, there may be multiple such electrical contacts applied to an electro-optic element to apply electric fields to multiple portions of the electro-optic material. Multiple portions of applied field provides multiple refractive boundaries within the electro-optic element and thus multiple steering portions of the electro-optic element. These may also be independently addressable such that each steering portion can be turned on, off, or varied in steering strength. Alternatively, to reduce the complexity of the required electronics, electrical contacts and respective steering portions may be addressed simultaneously. In such a case they may be designed such that they realise different steering angles, which may be through selection of the geometry of the respective contact and thus the refractive boundary it forms, and/or by weakening the electric field produced by selection of the material forming the contact or by physically separating the contacts by different amounts across the electro-optic element.

FIG. 4a illustrates an exemplary steering element in side view, with an optical axis 415a illustrated from left to right, and two other exemplary steering elements, in FIG. 4b and FIG. 4c, in leading surface, face-on view, with optical axes 415b, 415c depicted into the page. Such steering elements may be deployed alone or in combination with other elements in an optical arrangement 100 according to examples herein.

In FIG. 4b, the steering element is of square cross-section, with electrical contacts 423a, 423b spanning the top and bottom edges of the electro-optic element 421. In FIG. 4c, the steering element is circular in cross-section, with electrical contacts 433a, 433b spanning only a portion of the circumference of the electro-optic element 431.

In other examples, the steering elements may be of arbitrary cross-sectional shape, and in some examples the electrical contacts may span the entire perimeter of the steering element whereas in others only portions of the steering element are spanned by electrical contact. In further examples, there may be multiple electrical contacts arranged such that a respective electric field can be applied in a variable direction relative to the orientation of the steering element with the incident beam. This may be useful, for example, where the incident beam is polarised and the steering element comprises a birefringent material.

Figure 5:
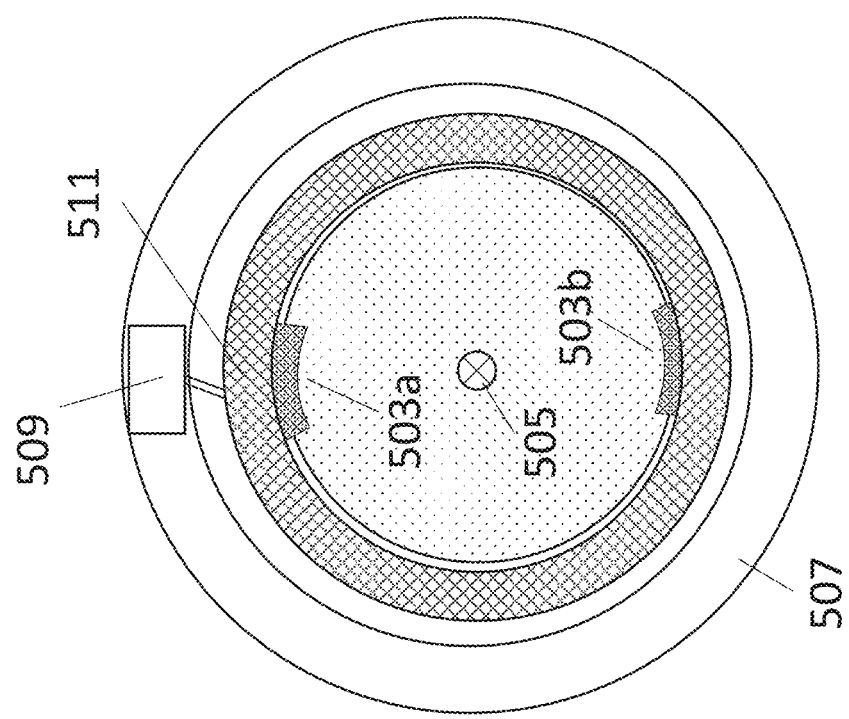
FIG. 5 is a schematic diagram of an exemplary steering element housed in a slip ring architecture and rotational mount.

FIG. 5 shows the steering element of FIG. 4c housed in a rotation mount 507, which allows the steering element to be rotated in a plane perpendicular to the optical axis 505.

Power is supplied, from a source (not shown) external to the steering element, to the electrical contacts 503a, 503b via a slip ring arrangement 509, 511, which allows the steering element to be rotated freely within the rotation mount 507 whilst still retaining electrical contact. In some examples, the slip ring arrangement 509, 511 may comprise separate slip rings responsible for providing power to their respective electrical contacts 503a, 503b. In other examples, one slip ring is used to provide power to an electronic module attached to the steering element, which distributes power as necessary to the electrical contacts. In further examples, power may be supplied through the slip ring(s) at low voltage and boosted up using an electronic module attached to the steering element.

Examples herein benefit from this kind of rotatable mount arrangement, whereby an electric field can be applied across an electro-optical prism when the prism has been actuated to different orientations. Indeed, such a rotatable mount arrangement provides that an electric field may be applied and/or varied while the orientation of the prism is being varied. High accuracy and fast-response examples may benefit from a continual ability to vary electric field and orientation at the same time.

In other examples, the steering element may be movably mounted to other support members, such as a motorized pitch/yaw platform or three-axis stage. A rotation mount may itself be movably mounted to enable further reorientation beyond that of the plane afforded by the rotation of the mount. In general, the range of angles through which a beam can be coarsely steered by a steering element is influenced by how the steering element is reorientable. The range of angles through which it is necessary to be able to coarsely steer the beam is influenced by the geometry of the communications scheme in which the pointing unit will be deployed. For example, the terminal and target may be coplanar, and so the beam only needs to be steered in one dimension, along a line. If two-dimensional steering is required, then a housing which allows for reorientation of a steering element in additional dimensions may be used. In general, the support member is chosen to allow for the total range of orientational freedom required of that steering element.

FIG. 6a and FIG. 6b show exemplary optical arrangements each comprising a pair of steering elements 601a, 601b arranged in a Risley topology. In this example the steering elements are wedge prisms. The two steering elements 601a, 601b are arranged substantially parallel to one another, with both centres substantially aligned along a common optical axis 605, and both being independently rotatable, about their centres, in a plane perpendicular to said optical axis 605. This allows a beam 610a to be steered to an arbitrary point within the bounds of an annulus, the annulus being defined by the optical and geometric properties of the constituent wedge prisms 601a, 601b. FIG. 6a shows the orientation of the prisms 601a, 601b achieving minimum steering and FIG. 6b shows the orientations of the prisms 601a, 601b achieving maximum steering.

Within a two-steering element Risley topology such as in FIG. 6, there is typically a boresight blind spot, which gives rise to a minimum steering of the beam. In examples where three or more steering elements are arranged in a Risley topology, this blind spot can be avoided and instead the total area of a circle is accessible by the steered beam, where the circumference of the circle relates to the maximum steering angle achieved by the individual steering elements. In examples with disparate steering elements, the FoR may instead be elliptical or some other shape, which may be advantageous depending on the geometry of the communications scheme.

FIGS. 2 to 6 illustrate examples of steering elements comprising substantially of one electro-optic element, and configurations thereof. However, the performance of the pointing unit, such as the FoR, may be enhanced through augmenting the steering element with additional optical elements. Such optical elements may include, but are not limited to, optical prisms, lenses, transmission and diffraction gratings, metasurface elements, spatial light modulators. We will presently discuss further examples of steering elements for use in pointing units.

Figure 7:
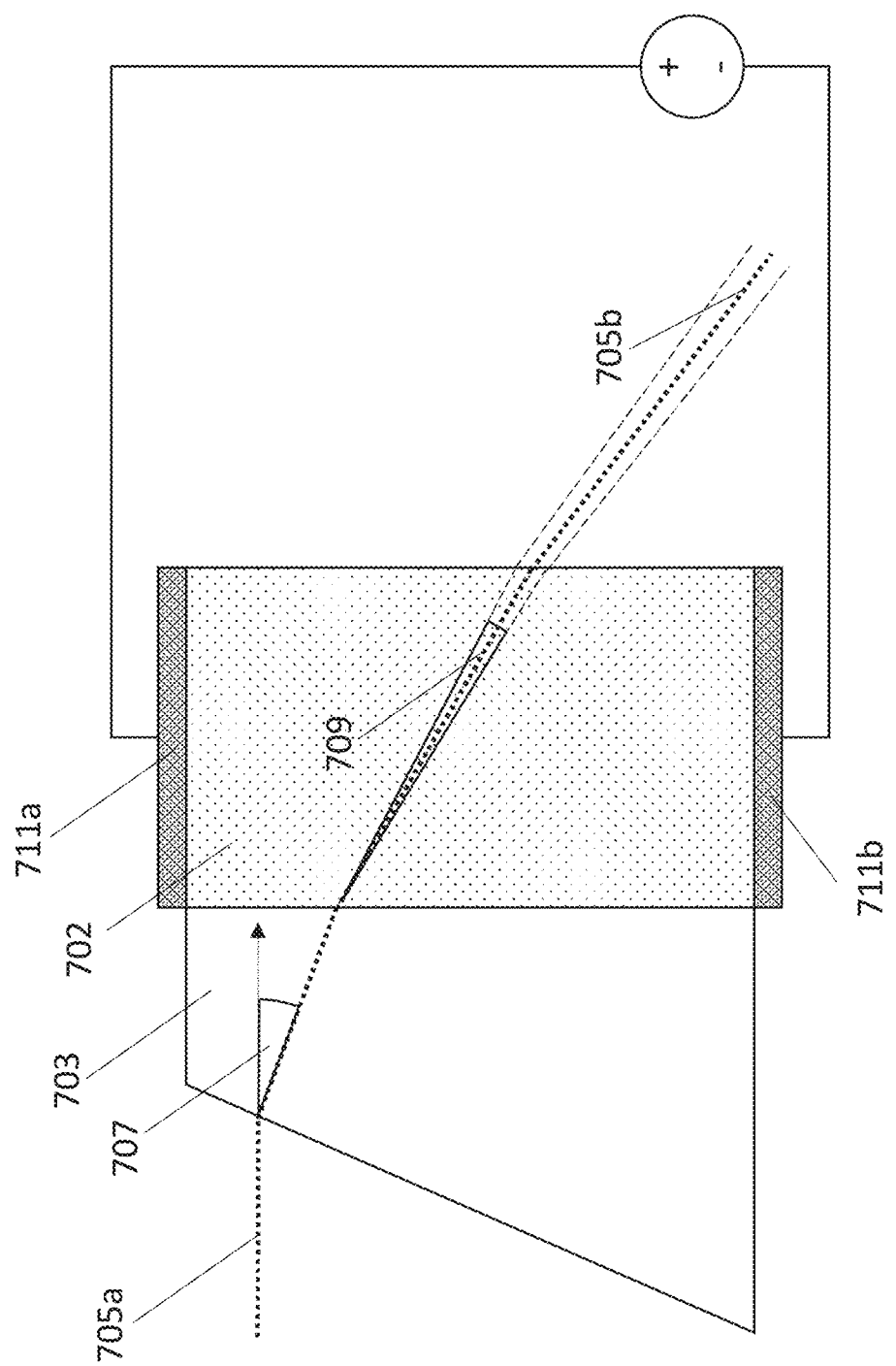
FIG. 7 is a schematic diagram of an exemplary steering element comprising two portions, an electro-optic portion and an optical element.

In FIG. 7 there is a side view of an exemplary steering element comprising a first portion, the first portion being an electro-optic element 702, and a second portion, the second portion being an optical element 703 of relatively high-index glass, the optical element 703 in this example being a wedge prism. The electro-optic element 702 is placed between electrical contacts 711a, 711b and the overall steering element is housed within a support structure (not shown in this instance).

In this example, the two elements 702, 703 are monolithic and form a first and a second layer of the steering element, though in other examples they may not be in physical contact but still housed by the same support structure, such that they undergo the same re-orientations.

In general, the layers may be attached together through means not limited to adhesives, such as optically clear epoxy, or mechanically fastened together by, for example, the housing. Alternatively, they may be monolithically fabricated through methods such as chemical vapor deposition or any appropriate fabrication method.

The optical element 703 of FIG. 7 achieves a first beam steering angle 707, or coarse steering. As the optical element 703 is formed from a relatively high-index glass, which has a larger refractive index than the electro-optic crystal forming the electro-optic element 702, the first beam steering angle 707 is typically increased compared to an equivalently shaped wedge prism formed from electro-optic crystal, such as in the exemplary steering element of FIG. 2. The electro-optic element 702 performs fine steering as described earlier, allowing the steered beam 705b to be adjusted within a fine range of angles 709.

The increased refractive index at the outer boundary of the steering element decreases the angle of the wedge prism required to attain a desired steering angle. Reducing the angle of the required wedge prism reduces its size, and therefore weight. This in turn reduces the weight of the pointing unit and FSO communications node, which is advantageous when the FSO communications node or pointing unit is to be mounted into a vehicle, for example.

When at least one or multiple such enhanced steering elements are arranged in a Risley configuration, for example the arrangement shown in FIGS. 6a and 6b, this increases the total steering angle achievable by the pointing unit, and hence its FoR. This may reduce the number of pointing units or FSO communications nodes required to afford a sufficiently large total FoR, such as a vehicle equipped with the pointing unit or FSO communications node requiring 360-degree communications vision. This may provide advantages including, but not limited to, lower total apparatus cost, reduced weight, reduced power consumption or reduced vehicle fuel consumption.

Whilst the optical element 703 forming the second layer presented in FIG. 7 is, in this example, a wedge prism, in other examples it may be any other optical element which gives rise to a beam steering. This includes optical elements which function through diffraction rather than refraction. These could include a transmission grating, whereby steering arises from the diffraction of the incident beam into a given diffraction order. In the case of a blazed transmission grating, optical power into the desired diffraction order is maximised relative to the residual power in other orders. The optical element may also be a metasurface planar optic element. In all cases, varying an orientation of an optical element is used to achieve a coarse steering, whilst the electro-optic element achieves fine steering.

FIGS. 8a and 8b illustrate a side view of two steering elements, without the housing shown. In both FIGS. 8a and 8b, the steering elements comprise an electro-optic element layer 801, 811 and an optical element layer 803, 813 in a monolithic structure. In this example, the optical elements 803, 813 are wedge prisms and the electro-optic elements 801, 811 are rectangular in cross-section. The electro-optic elements 801, 811 in both examples are bordered by electrical contacts 807a, 807b, 817a, 817b. Again, these configurations of layered steering elements may be deployed in Risley prism topologies as shown in FIGS. 6a and 6b. In other examples, the electro-optic elements or layers may be shaped as wedge prisms rather than as rectangular sections, or they may be shaped in other ways designed to meet predetermined FoR requirements.

In the example steering element of FIG. 8a, the electrical contacts 807a, 807b are located at the top and bottom edges of the steering element, spanning just the electro-optic portion 801, such than the electric field is applied to the electro-optic portion 801 and not (or at least far less so) to the optical element layer 803.

However, in other examples, the contacts may span the entire set of layered elements. If the optical element has a weak electro-optic response to the applied electric field, and so exhibits a negligible refractive index shift, an incident beam would only be perturbed by a minuscule amount. This may make it worthwhile for the contact to span the entire set of elements if there are beneficial reasons such as ease and/or cost of manufacture or improved structural qualities.

In the exemplary steering element of FIG. 8b, the electrical contacts 817a, 187b are placed as layers within the device in a plane substantially perpendicular to the optical axis 805. As discussed previously, indium tin oxides are one example of an optically transmissive, conductive material which could be used such that a beam can be steered through the device without significant attenuation (reflection, scattering or absorption). By arranging the contacts 817a, 817b to be placed in this manner, such that there is a smaller distance between them than those 807a, 807b in FIG. 8a, the required voltage to produce the desired electric field strength can be lower. However, analogous to the reasoning prescribed to the potential, alternative contact structures in FIG. 8a, in other examples the contacts may be located either side of the entire set of layered elements, to realise benefits in ease and/or cost of manufacture, structural integrity or any other reasons.

In FIG. 9, an exemplary optical arrangement is shown comprising four steering elements 901a-d arranged in a Risley topology, with two sets of Risley pairs, the optical arrangement being operated by a controller 919. Of course, a Risley pair of this kind could be deployed alone rather than with another pair, depending on steering requirements. In any event, each steering element 901a-d comprises an electro-optic element 902a-d and an optical element 903a-d arranged as a two-layered monolithic structure, housed within a rotational mount 908a-d. Each steering element features electrical contacts 905a-d, 905aa-dd to apply an electric field across their respective electro-optic elements 902a-d, thereby altering the refractive index of the electro-optic elements 902a-d. The controller 919 is arranged to independently control the electric field applied to each electro-optic element 902a-d. Each steering element 901a-d is independently housed in a rotation mount 908a-d which allows each steering element 901a-d to be rotated through 360 degrees about its centre in a plane substantially perpendicular to an optical axis of the arrangement 920. The controller 919 is arranged to independently control the rotation of each steering element 901a-d. A slip ring architecture (not pictured) is used to deliver power to the electrical contacts 905a-d, 905aa-dd of each steering element 901a-d (as illustrated in FIG. 5), at all orientations of their respective rotation mounts 908a-d. The optical arrangement is capable of coarse steering by rotation and fine steering by variation of electric field.

Figure 10A:
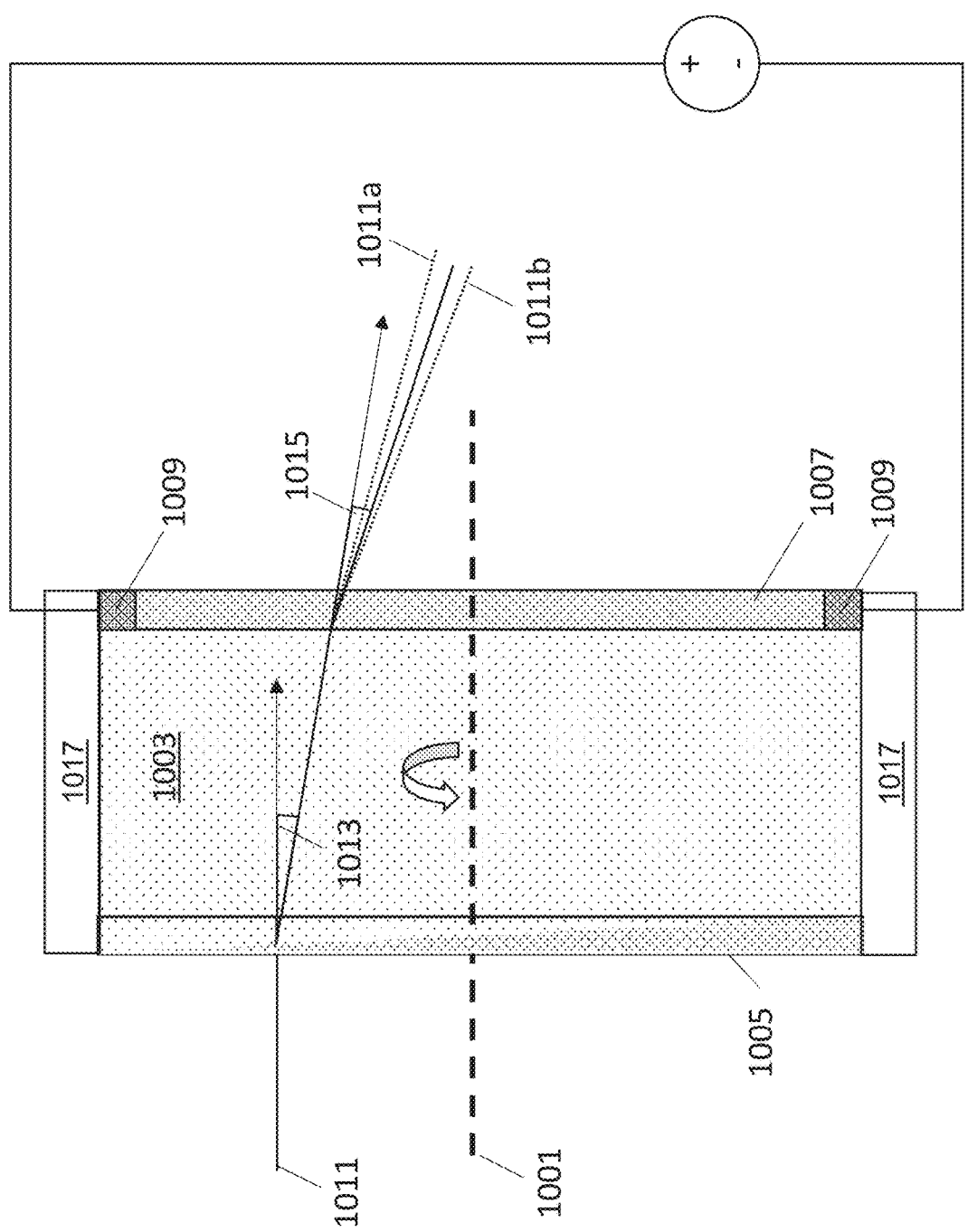
FIG. 10A is a schematic diagram of an exemplary steering element for use in a pointing unit, comprising a metasurface portion and a metadevice portion.
Figure 10B:
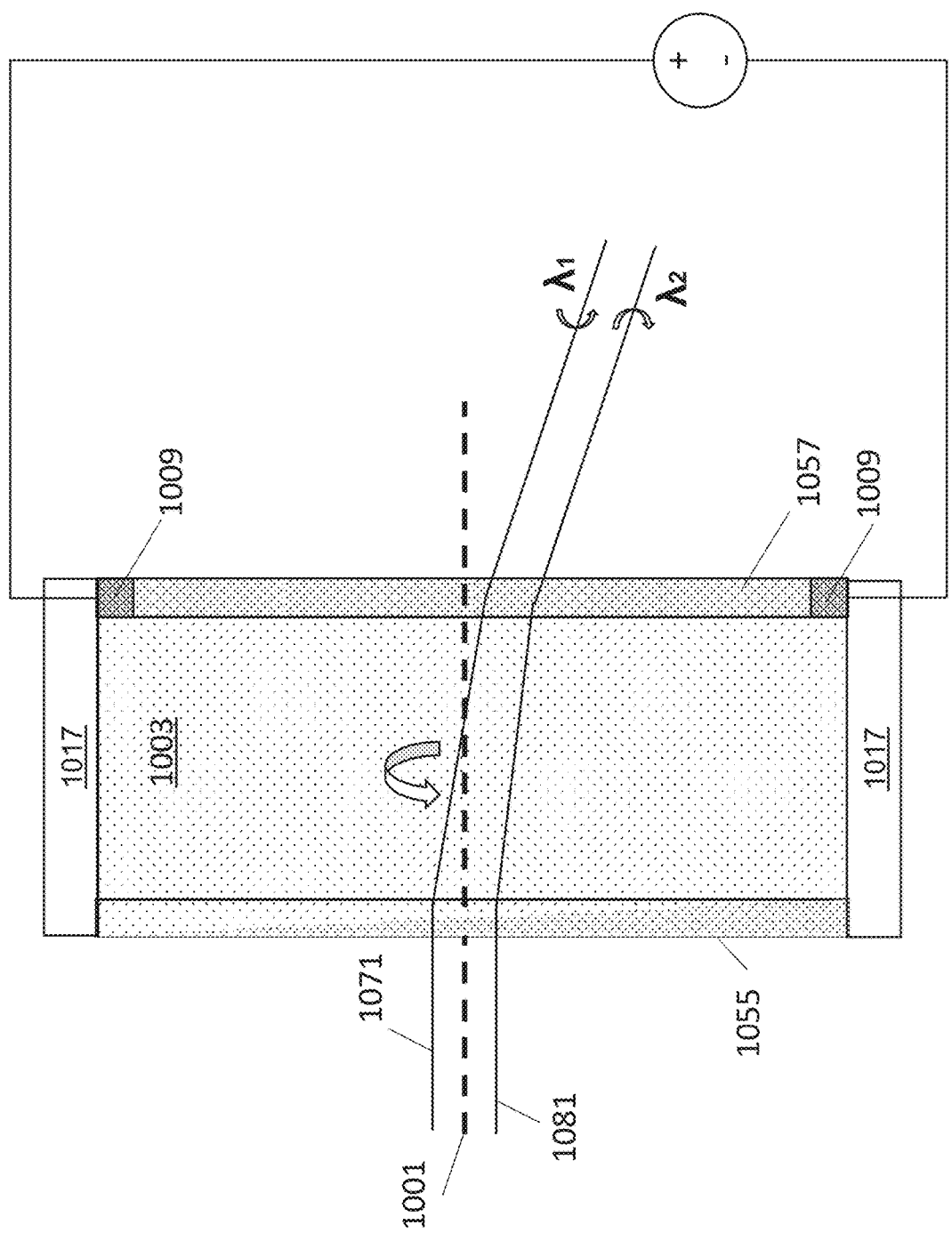
FIG. 10b is a schematic diagram of an exemplary steering element for use in a pointing unit, arranged to steer two beams at disparate wavelengths and polarisations

FIGS. 10A and 10B illustrate an example of an alternative, metamaterial-based steering element which is operable either in conjunction with, or instead of, the exemplary electro-optic steering elements described so far. This arrangement shares the same underlying principal of combining coarse steering, achieved through reorientation of the steering element, and fine steering, achieved through electrical control of the steering element. The arrangement can be used in the same optical arrangement 101 as found in the pointing unit 100 for use in a free space optical communications node 121.

An optical metamaterial is a material whose optical properties are dependent on the structure of the material, such structure often being artificially designed or engineered and such structure often being on sub-wavelength order of scale. These optical properties can be unique to the metamaterial and not found in naturally occurring materials. A metamaterial may be substantially fixed, or passive, in its optical behaviour, whereby its optical behaviour is determined at point of fabrication and cannot be modified during use. A metamaterial may also be designed to be dynamically configurable, modifiable, active or controllable, whereby its optical properties can be changed during use, and is herein described as a metadevice. A metamaterial which is substantially larger in two dimensions than a third dimension, such as a thin film, and/or which comprises a single layer rather than multiple layers, may be regarded as two-dimensional and is herein described as a metasurface. Those skilled in the art will appreciate that there is a broad design space for metamaterials depending on the desired optical properties thereof, and that in some circumstances it may be preferrable to use a volumetric metamaterial than a metasurface, for example, wherein a volumetric metamaterial has engineered structure, for instance comprising multiple layers, in three dimensions.

The exemplary steering element is displayed in FIGS. 10a and 10b in side view, and comprises two parallel portions sharing a common silicon substrate 1003, the parallel portions being perpendicular to a principal optical axis 1001 of the steering element. The first portion is a first metamaterial element and the second portion is a second metamaterial element. Both portions are operated and described hereafter in terms of optical transmission, rather than optical reflection. The first portion comprises a metasurface 1005, which causes a relatively large steering angle, and the second portion comprises a metadevice 1007, which causes a relatively smaller steering angle. The steering element is housed within a rotational housing element 1017, which allows for it to be rotated through 360 degrees perpendicular to an optical axis 1001. The metadevice receives power through electrical contacts 1009. It is hereafter assumed that the metadevice 1007 is powered and controllable in use, for example, by a slip ring arrangement as described in FIG. 5.

The metasurface 1005 of the first portion is a planar optical element featuring artificial structure on a subwavelength scale, the optical properties of the metasurface being governed by this artificial structure. In this example, the metasurface 1005 is formed of silicon and has imprinted on one side a ramp phase profile, fabricated using traditional CMOS deposition processes. It is configured such that it steers an incident beam by an angle, for example 30 degrees. The metasurface 1005 achieves this by altering the phase across the incident light wavefront, which allows the first portion to act, optically, like a wedge element of previous examples, by steering an incident beam 1011 at a first steering angle 1013.

The metadevice 1007 of the second portion is a planar optical device also featuring artificial structure on a subwavelength scale, but whose optical properties are modifiable by a control signal. In this example, the metadevice 1007 is an all-dielectric metadevice which comprises a zigzag array of elliptical silicon nanodisks, the nanodisks connected in each volume via silicon nanobars. The elements of the metasurface 1007 are configured as multijunction p-n structures, fabricated using traditional CMOS deposition processes. The metadevice 1007 is adapted to steer the incident beam 1011 at a second steering angle 1015, for example the second steering angle being 2 degrees. The optical properties of the metadevice 1007 are (dynamically) modifiable, in this example, by applying a bias voltage to the metadevice 1007 via the electrical contacts 1009. In this example, the metadevice has an input (not pictured) which allows an electrical signal, delivered via the electrical contacts 1009, to govern the optical behaviour of the metadevice. The dynamically modifiable optical properties allow the second steering angle 1015 to be modified, and the incident beam 1011 to be steered through a range 1011*a*, 1011*b*, for example +/−2 degrees.

As in other examples, when in use, a beam 1011 is incident on the metasurface 1005 of the first portion, parallel to an optical axis 1001 of the steering element, in this example, from left to right towards the left-hand surface, where it experiences a first steering 1013. Reorientation of the steering element allows for the overall steering of the beam 1011 to be adjusted in a coarse fashion. The beam 1011 continues through the steering element to the metadevice 1007 of the second portion where it experiences a second steering 1015 due to interaction with the metadevice 1007. The steering 1015 caused by the metadevice 1007 is controllable electrically, via electrical contacts 1009, to allow for fine steering of the incident beam 1011. The beam 1011 may equally, for example when transmitting rather than receiving, pass the other way through the steering element, from right to left, traversing the metadevice 1007 first and then the metasurface 1005. In that case, the incident beam (directed from a remote pointing device to the present arrangement) may not impinge on the right hand surface of the metadevice 1007 parallel to the principal axis 1001. The arrangement is then reorientated and controlled as necessary to deliver an output beam (not shown), emerging from the metasurface 1005 parallel to the principal axis 1001.

In this example, considering the steering afforded by the steering element at a given orientation, both the metadevice 1007 and the metasurface 1005 steer at steering angles lying in a common plane, allowing an incident beam to be steered in one dimension, to points along a line. However, it will be clear that, at a given orientation of the steering element, if the metadevice can steer a beam in two dimensions, the steering element can be used to steer the beam to points on a surface. Alternatively, a steering element may have two metadevices layers used in conjunction with one another, with a first metadevice steering in one direction and the other metadevice steering in a non-parallel direction, for example, in which the second direction is perpendicular to the first direction, such that a beam can be effectively steered in two dimensions whilst the steering element is at a given orientation.

According to the present example, the metadevice 1007 and metasurface 1005 are on the order of sub-millimetre thickness, and the substrate 1003 on which the metadevice 1007 and metasurface 1005 are formed is on the order of 2 millimetres thick. This allows the steering element to be relatively lightweight, for example, compared to a wedge prism steering element, which is designed to achieve a similar steering angle, and which is typically on the order of centimetres thick. This allows the steering element to be rotated more quickly, for a given set of rotation mount motors, and/or using less power. This allows for faster target acquisition of a respective pointing unit. The reduced weight of the steering element beneficially reduces the weight of the pointing unit and FSO communications node overall, which is advantageous when the FSO communications node or pointing unit is to be mounted into a vehicle, for example.

In this example, the metasurface 1005 is formed from silicon but, in general, the metasurface 1005 may be any surface exhibiting wavelength-scale structure which provides a sufficiently large steering angle for the desired FoR, for example +/−45 degrees. The metasurface 1005 could be formed from, for example, a liquid crystal on silicon architecture, or be formed from other dielectric materials entirely. Dielectric materials can be favourable due to their optical transmission at optical wavelengths, but other material compositions may be suitable depending on, for example, the intended wavelength range of use.

Alternatively, the metasurface 1005 could also be a metadevice and hence the steering angle provided 1013 could also be dynamically modifiable, providing the respective steering angle 1013 is sufficiently large for the desired FoR. In this case, the coarse steering may be provided by both reorientation of the steering element and control of the metasurface 1005.

In this example, the metadevice 1007 is an all-dielectric metasurface which comprises a zigzag array of elliptical silicon nanodisks, the nanodisks connected in each volume via silicon nanobars, and the elements of the metasurface configured as multijunction p-n structures, allowing the metadevice to act as a phase-only modulator. In general, the metadevice 1007 may be formed of multiple portions, such portions including but not limited to metasurfaces, metamaterials, and phase-change materials. Such metadevices may be controlled electronically as in the present example of FIGS. 10*a* and 10*b*, but in other examples the optical properties of the metadevice portion may be controlled in other ways, for example acoustically, thermally, or optically via a pump laser, and the electrical contacts 1009 and input substituted for an appropriate control mechanism. On reading the present disclosure, it will be clear to those skilled in the art that any metadevice which provides the ability to adjustably steer a beam with sufficient control (for example, +/−1 μrad) over a shallow angle range (for example, +/−2 degrees) could be effectively used for the fine steering portion of the steering element.

In this example, the substrate 1003 is silicon but in other examples may be composed of another material for reasons including but not limited to: the optical performance at the desired wavelength of operation, and ease of manufacture of, or compatibility with, the metasurface and or metadevice.

In this example, the portions are formed on a common substrate 1003 and so form a monolithic structure. However, in other examples, each portion may have an independent substrate, and the two portions secured together mechanically or adhesively. Equally, either or both portions may not require a substrate and may instead be attached directly to the other or others.

FIG. 10*a* illustrates an exemplary metamaterial steering element which steers a single beam at a single wavelength. In general, the steering afforded by metasurfaces and metadevices has a wavelength dependency. A second beam incident on the steering element of FIG. 10*a* with a different wavelength to the first beam 1011 will therefore be steered at a different steering angle. This can be problematic for a pointing unit where a first beam at a first wavelength is used to transmit information and a second beam at a second wavelength is used to receive information, and where both beams need to be guided from and to the same transceiver terminals, such that both beams should be steered by the pointing unit in an identical fashion. However, metasurfaces and metadevices can be configured, through selection of a respective artificial sub-wavelength scale structure, to have a polarisation sensitivity. For example, chiral nanostructures may cause left-handed polarised light to interact with the metasurface or metadevice differently to right-handed polarised light. Selection of metasurfaces and metadevices with these principles in mind can therefore allow one steering element to steer two beams in the same direction, where each beam is of a respective wavelength and has a respective polarisation, the respective wavelengths different to one another and the respective polarisations orthogonal to one another. Put another way, differences in steering angle that would otherwise arise due to different beam wavelengths can be corrected for (or compensated for) by taking advantage of polarisation dependency in steering angle.

FIG. 10*b* illustrates an exemplary steering element which is equipped with a metasurface 1055 and a metadevice 1057. The metasurface 1055 and metadevice 1057 are configured to steer a first beam 1071 of a first wavelength and first polarisation and a second beam 1081 of a second wavelength and second polarisation. The metasurface 1055 steers the first beam 1071 at a first angle, and the second beam 1081 at a second, lesser angle. Likewise, the metadevice steers the first beam 1071 at a third angle, and the second beam 1081 at a fourth, greater angle. The difference in steering of the two beams due to the metasurface is compensated for by the difference in steering of the two beams due to the metadevice. In this way, overall, the first beam and the second beam have experienced the same aggregate degree or amount of steering when emerging from the steering element. In this example, the first beam 1071 has a wavelength 1550 nm and has a left-handed circular polarisation, and the second beam 1081 has a wavelength 1570 nm and has a right-handed circular polarisation, but in other examples these wavelengths may be closer or further apart and the polarisations may be linear, providing the metasurface and metadevices are chosen appropriately.

In the example of FIGS. 10*a* and 10*b*, the steering element comprises just two portions, but it may comprise further portions. FIGS. 11*a*-11*c* illustrate further examples of metamaterial-based steering elements, wherein each steering element comprises multiple steering portions. In general such an approach can be useful because, for example, the metasurface 1005 and metadevice 1007 are typically arranged to operate at a predetermined wavelength range, and so multiple such metasurfaces or metadevices may be included to address disparate wavelength ranges. This may be useful, for instance, where communications occur on different wavelengths for transmit and receive directions.

During the description of FIGS. 11*a* and 11*b*, the pair of metasurface and metadevice portions arranged on a common substrate are referred to as a steering duo, for brevity.

FIG. 11*a* illustrates a steering element which has a first steering duo of metasurface 1103*a* and metadevice 1107*a* portions formed on a common substrate 1105*a* and a second steering duo of metasurface 1109*a* and metadevice 1113*a* formed on a common substrate 1111*a*, all housed in rotational housing 1110*a*, which rotates about an optical axis 1101. All steering portions in this example are therefore in fixed alignment relative to each other and are rotated concurrently by the rotational housing 1110*a*.

The first steering duo 1103*a*, 1107*a* is arranged to provide a first overall steering based on a first coarse steering and a first fine steering for incident beams, with incident beams of different wavelengths and polarisations experiencing a different amount of overall steering The second steering duo 1109*a*, 1113*a* is arranged to provide a second overall steering based on a second coarse steering and a second fine steering for incident beams, with incident beams of different wavelengths and polarisations experiencing a different amount of overall steering.

The steering element of FIG. 11*a* is arranged, therefore, to provide an overall steering angle which is based on the first overall steering caused by the first steering duo and a second overall steering caused by the second steering duo.

In FIG. 11*a*, as shown, the overall steering angle achieved by the steering element is the same for a first beam 1115 at a first wavelength and polarisation (e.g. 1550 nm, left-handed circular) and a second beam 1117 at a second wavelength and polarisation (e.g. 1570 nm, right-handed circular), thereby allowing the steering element to steer multiple beams of different wavelengths towards a target. This is because the first steering duo 1103*a*, 1107*a* causes greater steering to the first beam 1115 than the second beam 1117 while the second steering duo 1109*a*, 1113*a* causes greater steering to the second beam 1117 than the first beam 1115.

In FIG. 11*a*, the first steering duo 1103*a*, 1107*a* and second steering duo 1109*a*, 1113*a* together form one monolithic structure. FIG. 11*b* illustrates an alternative example substantially similar in purpose to that of FIG. 11*a*, where a first steering duo 1103*b*, 1107*b* of metasurface 1103*b* and metadevice 1107*b* are formed on a common substrate 1105*b*, and a second steering duo 1109*b*, 1113*b* of metasurface 1109*b* and metadevice 1113*b* are formed on a common substrate 1111*b*. Both steering duos are nevertheless housed by the same rotational support housing 1110*b*, and so their relative alignment is fixed and they rotate together.

Whilst both steering duos in FIG. 11*b* are housed by the same rotational support housing 1110*b*, the two steering duos are not monolithic with respect to the other duo and are separated by an air gap 1130. As described for FIGS. 10*a* and 10*b*, in other examples, each metasurface and metadevice may have its own independent substrate, and may not be in physical contact with any other steering portion, besides being housed in examples by the same rotational housing element.

FIG. 11c illustrates a further example of a steering element comprising multiple portions housed in a common rotational housing 1110c. The steering element has a metasurface 1103c, providing coarse steering of a beam 1120, and three metadevices 1111c, 1113c, 1115c, separated from one another by substrate layers 1105c, 1107c, 1109c, respectively, to provide fine steering. Each of the metasurface 1103c and metadevices can be arranged to steer beams having different wavelengths/polarisations by a different amount, to attain the same overall degree of steering for each beam passing through the steering element. It is considered that providing additional metamaterial elements, as in this case, provides additional degrees of freedom for steering beams having different wavelength and polarisation characteristics.

Figure 12:
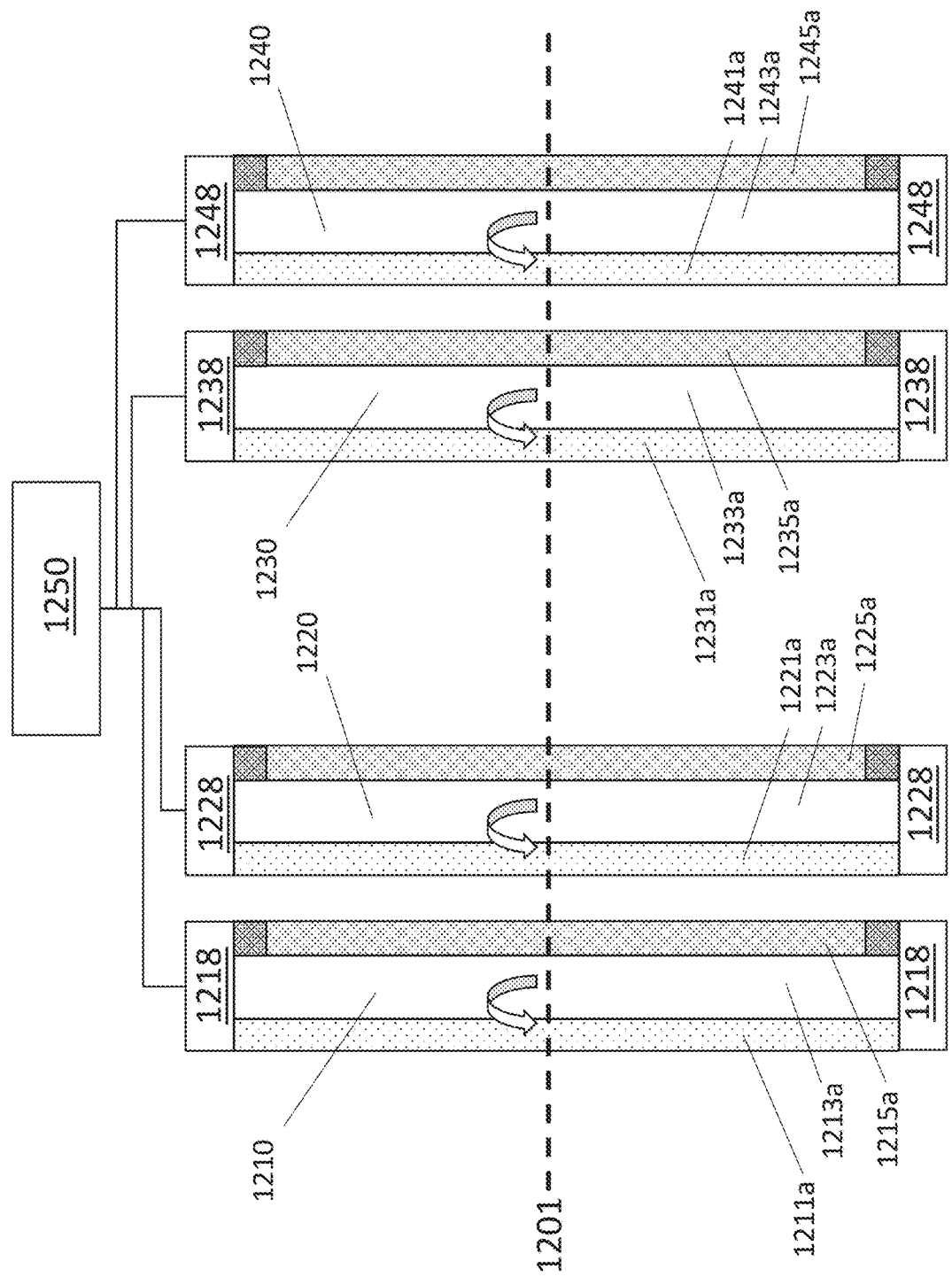
FIG. 12 is a schematic diagram of an exemplary Risley topology comprising four steering elements, the steering elements comprising a metasurface portion and a metadevice portion.

FIGS. 10a, 10b, and 11a-11c described individual metamaterial-based steering elements. As for the electro-optic steering elements described previously, these metamaterial-based steering elements can be arranged in pairs to form a Risley topology. FIG. 12 illustrates such an arrangement.

FIG. 12 illustrates an exemplary optical arrangement comprising four steering elements 1210, 1220, 1230, 1240, arranged in two Risley pairs 1210, 1220 and 1230, 1240. The first steering element 1210 comprises a metasurface 1211a and a metadevice 1215a on a common substrate 1213a housed in a rotational mount 1218, the rotational mount able to rotate the steering element through 360 degrees in a plane perpendicular to the optical axis 1201. Control of the metadevice 1215a is provided through electrical contacts via a slip ring arrangement as previously described. The rotational mount 1218 is controlled by a controller 1250.

The same structure applies to the remaining steering elements: the second steering element 1220 comprises a metasurface 1221a and a metadevice 1225a on a common substrate 1223a housed in a rotational mount 1228, the third steering element 1230 comprises a metasurface 1231a and a metadevice 1235a on a common substrate 1233a housed in a rotational mount 1238, and the fourth steering element 1240 comprises a metasurface 1241a and a metadevice 1245a on a common substrate 1243a housed in a rotational mount 1248. All steering elements are rotatable through 360 degrees in a plane perpendicular to the optical axis 1201 due to the rotational mounts 1228, 1238, 1248, and all the rotational mounts 1228, 1238, 1248 are controlled by the controller 1250.

As described previously, a Risley pair of steering elements allows an incident beam to be steered to an arbitrary point within the bounds of an annulus, the annulus being defined by the optical properties of the steering elements. Having two or more such pairs may eradicate the existence of the boresight blind spot, the central region of the annulus where a conventional Risley pair cannot steer a beam to.

In this example, the first pair of steering elements 1210, 1220 and second pair of steering elements 1230, 1240 are designed to function at the same wavelength of 1550 nm. However, in other examples, the optical arrangement may be arranged to steer multiple beams at multiple wavelengths and polarisations.

It will be clear to those skilled in the art that whilst the example illustrated in FIG. 12 has two Risley pairs, in practice more than two pairs might be used in an optical arrangement in order to, for example, remove blind spots from the optical arrangement, and/or provide steering at multiple wavelengths.

In all examples of metamaterial-based steering elements described thus far, the metadevice and metasurface portions have only been used for beam steering. However, it is clear to those skilled in the art that these portions can be further or alternatively arranged for optical operations including but not limited to beam shaping, chromatic aberration compensation, focussing, and defocussing, according to the requirements of the optical arrangement and pointing unit.

As described for other exemplary steering elements, those skilled in the art will appreciate steering elements according to the example depicted by FIGS. 10a and 10b may feature additional layers such as spectral bandpass coatings, anti-reflection coatings, high-reflectance coatings, protective coatings against UV and ionising radiation.

In some examples, a vehicle may be provided with a pointing unit and/or FSO communications node comprising steering elements according to any of the examples described herein. For example, the FSO communications node may be mounted within the chassis or fuselage of a vehicle. In some examples, the vehicle may be an aircraft, such as an airplane, drone or a high-altitude aircraft. The vehicle may alternatively or additionally be a spacecraft, such as a satellite.

Figure 13:
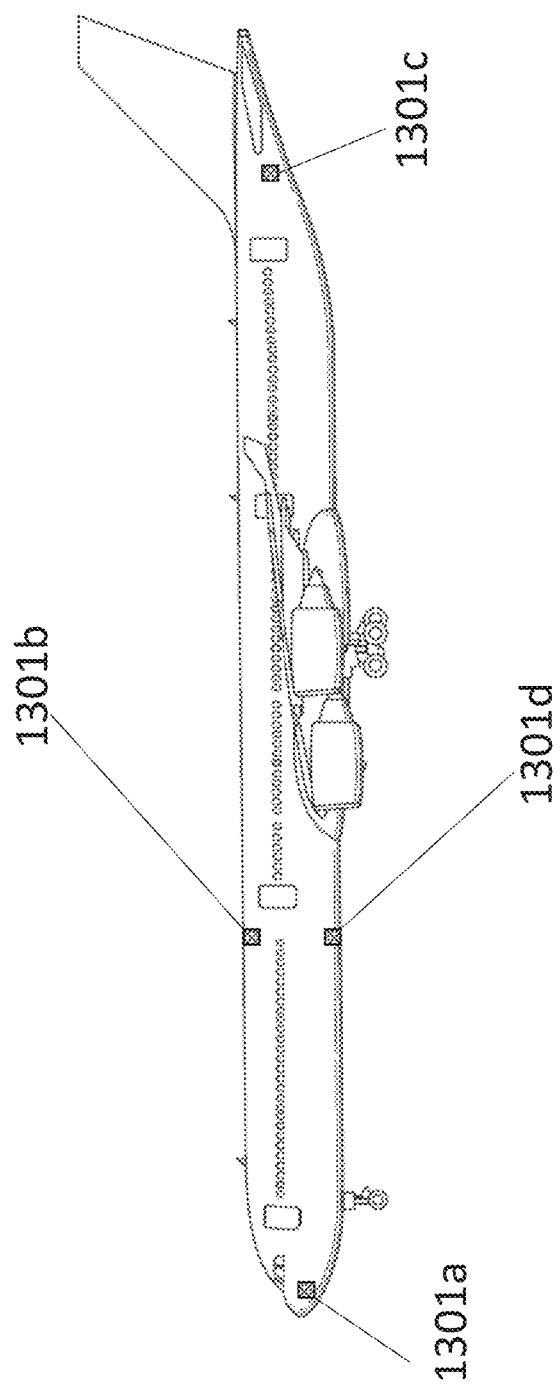
FIG. 13 is an example of an aircraft on which there are mounted multiple FSO communications nodes according to examples herein.

FIG. 13 illustrates an example vehicle, in this case an aircraft, with which the example FSO communications nodes described herein may be used. In this example, the aircraft is equipped with four such nodes 1301a-1301d, located below 1301a the cockpit, above and below 1301b, 1301d the centre fuselage, and on 1301c the rear fuselage of the aircraft, to afford the aircraft an overall FoR in all directions. Providing a vehicle/aircraft/spacecraft with the FSO communications node 121 may allow the vehicle/aircraft/spacecraft to communicate with other vehicles/aircraft/spacecraft and/or ground based units via optical communications. For example, a network of aircraft/spacecraft may be deployed to provide FSO communications over a wide area. The reduced space, weight and/or power provided by examples of the FSO communications node 121 described herein may be of particular benefit in aircraft and spacecraft, particularly in lightweight and/or small aircraft/spacecraft such as drones and/or satellites, where space weight and power budgets are restricted.

Figure 14:
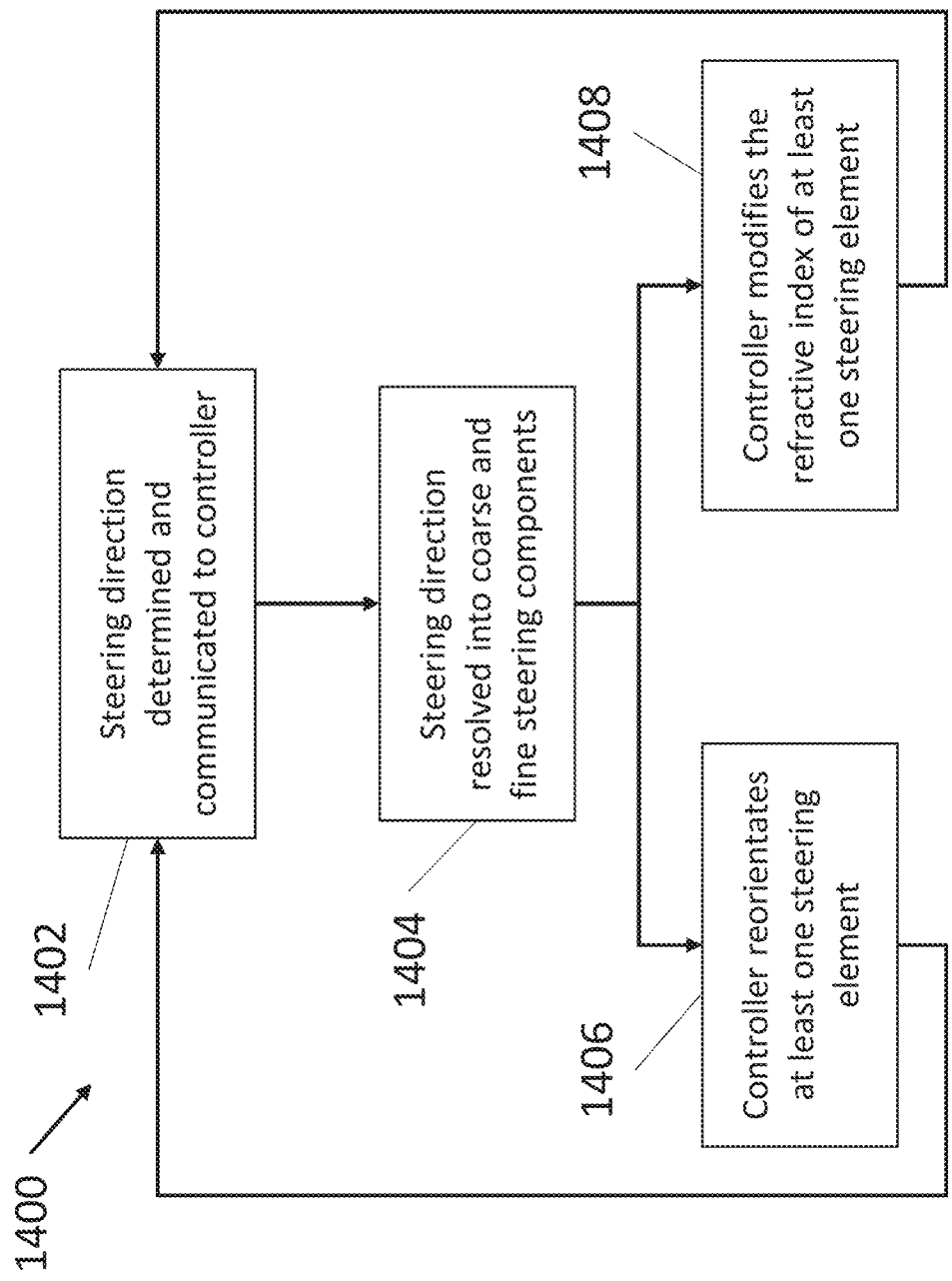
FIG. 14 is a flow chart of a process for steering a beam using a steering unit according to examples herein.

FIG. 14 illustrates an example 1400 of operating a pointing unit according to examples herein, for example for nodes on an aircraft according to FIG. 13. The example may be performed by the FSO communications node 121 of FIG. 1. In a first block 1402, a steering direction is determined, for example by a tracking guidance unit 112, and communicated to a controller 103, to control steering elements 101a, 101b or an optical arrangement 101. The controller 103 resolves the steering direction into a reorientation component (i.e. a coarse steering component for coarse steering), and a refractive index component (i.e. a fine steering component for fine steering), in a second block 1404. According to this example, the resolving uses predetermined geometric transformations/relationships that are known and specific to the make-up of the optical arrangement 101. The geometric transformations may be calculated and/or depend on a stored look-up table of values, for example. In a third block 1406, the controller 103 reorientates at least one steering element 101a and/or 101b according to the reorientation component. In a fourth block 1408, the controller 103 modifies the refractive index of at least one steering element 101a and/or 101b according to the refractive index component. The combination or reorientation and variation of refractive index match the determined steering direction. The coarse steering and fine steering occur concurrently to perform accurate and responsive beam steering according to examples herein. The process repeats in a continuous manner during any communications session. In examples, each steering element 101a and 101b may be a composite structure, for example as illustrated in FIG. 7. In such an example, each steering element may be individually reorientated, and the refractive index of its electro-optic layer may be varied, to perform, respectively, coarse and fine steering.

In all examples presented thus far, where it is described that a refractive index is modified to achieve a change in steering angle, it should be understood that this is not limited to changing the bulk refractive index of a material, for example by applying an electric field. The refractive index may be the effective refractive index of a component, which is altered, for example, by altering the waveguiding structure of the component. Equally, modifying the refractive index may refer to modifying the refractive indices of several components, for example, substructures or layers of a metadevice. The refractive index may be considered to be the complex refractive index, wherein both the real and complex part may be varied. It will be understood by those skilled in the art that modifying the refractive index to vary a steering describes modifying the optical properties of the steering element in order to vary a steering, rather than reorientating the steering element as a whole relative to the incoming beam to vary a steering.

In all examples presented thus far the steering elements have been presented without additional optical layers. However, those skilled in the art will appreciate that they may feature additional layers such as spectral bandpass coatings, anti-reflection coatings, high-reflectance coatings, protective coatings against UV and ionising radiation.

Where electro-optic crystals are described it is to be understood that this refers to materials such as, but not limited to, $LiNbO_3$, $BaTiO_3$, SBN75, KTN, KBN, or SCNN.

In all examples presented thus far the element responsible for fine steering has been an electro-optic element. However, those skilled in the art will appreciate that this could be replaced by an acousto-optic deflector or similar.

In all references to refractive index it is to be understood that this implicitly refers to the refractive index at a particular wavelength, unless indicated otherwise.

In all examples presented thus far where either the electro-optical element or optical element has been a prism, they have been presented as wedge prisms. However, those skilled in the art will appreciate that this prismatic structure could instead be a compound or composite prism.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. Moreover, the word "or" means and/or unless the context of its use clearly indicates that or is an exclusive (either one or the other but not both).

The invention claimed is:

1. A pointing unit configured for use with a free space optical communications terminal, the pointing unit comprising:
   an optical arrangement comprising an optically transmissive steering element arranged in an optical path of an incident beam entering the optical arrangement, wherein the optically transmissive steering element has a principal axis parallel to an input direction of the incident beam, and the optically transmissive steering element includes:
   a first portion configured to steer the incident beam by a first steering angle relative to the first portion, and
   a second portion configured to steer the incident beam by a second steering angle smaller than the first steering angle, wherein the first steering angle and the second steering angle are co-planar;
   a rotational housing or rotational mount supporting the optical arrangement, wherein the first portion and the second portion of the steering element are fixed together and turn together by the rotational housing or the rotational mount, and
   at least one controller configured to:
   steer the incident beam to the first steering angle by causing the rotational housing or rotational mount to rotate the optically transmissive steering element in a plane perpendicular to the principal axis, and
   steer the incident beam to the second steering angle by electrically controlling the second portion,
   wherein the steering of the incident beam to the first steering angle and to the second steering angle directs the incident beam to a target.

2. The pointing unit according to claim 1, wherein an overall beam steering angle is a function of the first steering angle and the second steering angle and the overall beam steering angle directs the incident beam to the target.

3. The pointing unit according to claim 1, wherein the second steering angle is variable according to the electrically controlling of the second portion.

4. The pointing unit according to claim 1, wherein the optically transmissive steering element is a first optically transmissive steering element of a pair of optically transmissive steering elements, and the pair of optically transmissive steering elements are arranged as and controlled by the at least one controller as a Risley pair.

5. An aircraft equipped with the pointing unit according to claim 1.

6. The pointing unit according to claim 1, wherein the first portion is a first optically transmissive metamaterial element and the second portion is a second optically transmissive metamaterial element.

7. The pointing unit according to claim 6, wherein the optically transmissive steering element is monolithic element, and the first optically transmissive metamaterial element is a first layer of the monolithic element and the second optically transmissive metamaterial element is a second layer of the monolithic element.

8. The pointing unit according to claim 1, wherein the first portion is configured to steer the incident beam to the first steering angle to an opening angle in a range that extends to 90 degrees, and the second portion is configured to steer the incident beam to the steering angle that is a variable angle in a range of plus or minus 2 degrees relative to the first steering angle.

* * * * *